United States Patent
Nair et al.

(10) Patent No.: US 11,707,987 B1
(45) Date of Patent: Jul. 25, 2023

(54) VEHICLE SIMULATING METHOD AND SYSTEM

(71) Applicant: Mercedes-Benz Group AG, Stuttgart (DE)

(72) Inventors: Manoj Mohanan Nair, Kirkland, WA (US); Noah Gibbon, Seattle, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/062,293

(22) Filed: Dec. 6, 2022

(51) Int. Cl.
  *G05G 1/01* (2008.04)
  *G05D 1/02* (2020.01)
  (Continued)

(52) U.S. Cl.
  CPC ............ *B60L 3/12* (2013.01); *B60W 50/045* (2013.01); *B60L 2240/10* (2013.01);
  (Continued)

(58) Field of Classification Search
  CPC ............ B60L 2240/00; B60L 2240/10; B60L 2240/12; B60L 2240/14; B60L 2240/60;
  (Continued)

(56) References Cited

U.S. PATENT DOCUMENTS 9,902,252 B2 * 2/2018 Biderman ............... B60C 5/005
10,583,792 B2 * 3/2020 List ..................... G01M 17/007
(Continued)

FOREIGN PATENT DOCUMENTS

CA  2761334 A1 * 11/2010 ......... B60G 17/0164
CA  2761334 C  * 11/2013 ......... B60G 17/0164
(Continued)

OTHER PUBLICATIONS

D. -M. Kim, P. Benoliel, D. -K. Kim, T. H. Lee, J. W. Park and J. -P. Hong, "Framework Development of Series Hybrid Powertrain Design for Heavy-Duty Vehicle Considering Driving Conditions," in IEEE Trans on Vehicular Technology, vol. 68, No. 7, pp. 6468-6480, Jul. 2019, doi: 10.1109/TVT.2019.2914868 (Year: 2019).*
(Continued)

*Primary Examiner* — Cuong H Nguyen
(74) *Attorney, Agent, or Firm* — Anova Law Group, PLLC

(57) ABSTRACT

A simulating method for an electric vehicle (EV) includes creating a simulation model associating a plurality of target behaviors of a target vehicle with the EV, obtaining a plurality of vehicle parameters of the EV to generate a set of EV control parameters, obtaining a plurality of configuration parameters of the target vehicle, based on the set of EV control parameters and the plurality of configuration parameters of the target vehicle, using the simulation model to provide a set of simulated target-vehicle controls, where the simulation model is a neural network trained to reflect a relationship between the set of EV control parameters and the set of simulated target-vehicle controls, and outputting the set of simulated target-vehicle controls to the EV, such that the EV is controlled to achieve the plurality of target behaviors of the target vehicle based on the set of simulated target-vehicle controls.

20 Claims, 12 Drawing Sheets

(51) Int. Cl.
*G08G 1/123* (2006.01)
*B60L 3/12* (2006.01)
*B60W 50/04* (2006.01)
*B60W 50/00* (2006.01)
*B60W 30/12* (2020.01)
*B60W 30/10* (2006.01)
*G01C 21/28* (2006.01)

(52) U.S. Cl.
CPC ....... *B60L 2260/40* (2013.01); *B60L 2260/44* (2013.01); *B60W 30/10* (2013.01); *B60W 30/12* (2013.01); *B60W 2050/0075* (2013.01); *B60W 2556/45* (2020.02); *G01C 21/28* (2013.01); *Y02T 10/84* (2013.01)

(58) Field of Classification Search
CPC ............. B60L 2240/62; B60L 2240/64; B60L 2240/642; B60L 2240/645; B60L 2240/647; B60L 2240/66; B60L 2240/662; B60L 2240/68; B60L 2240/665; B60L 2240/667; B60L 3/12; B60L 2250/22; B60L 2260/40; B60L 2260/44; B60W 20/50; B60W 50/045; B60W 30/10; B60W 30/12; G01C 21/34; G01C 21/28; B60Q 5/00; B60Q 5/008; G05D 1/0088; Y02T 10/84; G08G 1/167
USPC .......................................................... 701/22
See application file for complete search history.

(56) References Cited

U.S. PATENT DOCUMENTS

| | | | |
|---|---|---|---|
| 10,938,310 B1* | 3/2021 | Cheng | H02M 3/33515 |
| 11,065,978 B2* | 7/2021 | Aykol | G05B 13/0265 |
| 11,069,926 B1* | 7/2021 | Kohn | B60L 58/10 |
| 11,079,437 B2* | 8/2021 | Shoa Hassani Lashidani | G01R 31/3835 |
| 11,119,494 B2* | 9/2021 | Gu | G08G 5/0013 |
| 11,293,987 B2* | 4/2022 | Lee | G01R 31/367 |
| 11,325,492 B2* | 5/2022 | Viswanathan | B60L 58/13 |
| 11,325,494 B2* | 5/2022 | Aykol | B60L 53/30 |
| 11,360,155 B2* | 6/2022 | Senn | G01R 31/367 |
| 11,409,654 B2* | 8/2022 | Bielby | G06N 3/08 |
| 11,446,966 B2* | 9/2022 | Stowell | C01B 32/182 |
| 11,479,062 B2* | 10/2022 | Stowell | G06K 19/07764 |
| 11,498,388 B2* | 11/2022 | Kale | G06N 3/08 |
| 11,532,943 B1* | 12/2022 | Zauli | H02J 7/00712 |
| 2013/0191052 A1* | 7/2013 | Fernandez | G01R 21/00 702/60 |
| 2020/0164763 A1* | 5/2020 | Holme | B60L 58/10 |
| 2021/0053487 A1 | 2/2021 | Vangelov et al. | |
| 2021/0107372 A1* | 4/2021 | Viswanathan | B60L 53/66 |

FOREIGN PATENT DOCUMENTS

| | | | | |
|---|---|---|---|---|
| CN | 104648238 A | * | 5/2015 | ............ B60Q 5/008 |
| CN | 112613128 A | * | 4/2021 | ................ B60L 3/12 |
| CN | 113165531 A | * | 7/2021 | ................ B60L 7/18 |
| CN | 113273068 A | * | 8/2021 | ............. H02M 1/32 |
| CN | 109050348 B | * | 12/2021 | ............. B60L 15/20 |
| CN | 113928187 A | * | 1/2022 | .......... B60L 2240/42 |
| CN | 114954022 A | * | 8/2022 | ................ B60L 3/12 |
| CN | 115092012 A | * | 9/2022 | .......... B60L 2260/52 |
| DE | 102011007152 A1 | * | 10/2012 | .......... B60L 15/2045 |
| DE | 102018004133 A1 | * | 12/2018 | ................ B60L 1/00 |
| DE | 102018212733 A1 | * | 2/2020 | ........ B60W 50/0205 |
| EP | 2660791 A1 | * | 11/2013 | ............. B60L 1/003 |
| FR | 2982824 A1 | * | 5/2013 | ............ B60W 10/06 |
| FR | 2993213 A1 | * | 1/2014 | .......... B60L 11/1861 |
| WO | WO-2020198451 A1 | * | 10/2020 | ............. B60C 11/00 |

OTHER PUBLICATIONS

Y. Hu, L. Yang, B. Yan, T. Yan and P. Ma, "An Online Rolling Optimal Control Strategy for Commuter Hybrid Electric Vehicles Based on Driving Condition Learning and Prediction," in IEEE Transactions on Vehicular Technology, vol. 65, No. 6, pp. 4312-4327, Jun. 2016, doi: 10.1109/TVT.2015.2444876. (Year: 2016).*

X. Tang, J. Chen, T. Liu, Y. Qin and D. Cao, "Distributed Deep Reinforcement Learning-Based Energy and Emission Management Strategy for Hybrid Electric Vehicles," in IEEE Transactions on Vehicular Technology, vol. 70, No. 10, pp. 9922-9934, Oct. 2021, doi : 10.1109/TVT.2021.3107734. (Year: 2021).*

F. Tianheng, Y. Lin, G. Qing, H. Yanqing, Y. Ting and Y. Bin, "A Supervisory Control Strategy for Plug-In Hybrid Electric Vehicles Based on Energy Demand Prediction and Route Preview," in IEEE Transactions on Vehicular Technology, vol. 64, No. 5, pp. 1691-1700, May 2015, doi: 10.1109/TVT.2014.2336378 (Year: 2015).*

* cited by examiner

580

| Driver identification 582 |
| Driver personal information 584 |
| Driver vehicle information 586 |
| Driver account information 588 |
| Social media information 590 |
| Target profile list 592 |
| Other information 594 |

FIG. 5C

VEHICLE SIMULATING METHOD AND SYSTEM

TECHNICAL FIELD

The present disclosure relates to the technical field of electric vehicles (EVs) and, more particularly, to a vehicle simulating method and system for simulating a target behavior of a target vehicle on an electric vehicle.

BACKGROUND

Electric vehicles behave differently as compared to internal combustion engine (ICE) vehicles. For example, unlike the ICE vehicles, the EVs do not have the need to maintain an engine speed within a limited range. As a result, the EVs do not have a sawtooth like torque-speed curve of the ICE vehicles. For another example, while a driver of an EV may enjoy quiet and fast acceleration of electric motors, the driver may lose the fun of hearing a gas engine sound and feeling the vibration as the gas engine roars. Thus, there are different driving experiences for drivers of the EVs and the ICE vehicles, and these differences may prevent drivers of more traditional vehicles from purchasing the EVs. The disclosed methods and systems are directed to solve one or more problems set forth above and other problems.

SUMMARY

One aspect of the present disclosure provides a simulating method for an electric vehicle (EV). The method may include creating a simulation model associating a plurality of target behaviors of a target vehicle with the EV; obtaining a plurality of vehicle parameters of the EV to generate a set of EV control parameters; obtaining a plurality of configuration parameters of the target vehicle; based on the set of EV control parameters and the plurality of configuration parameters of the target vehicle, using the simulation model to provide a set of simulated target-vehicle controls, wherein the simulation model is a neural network trained to reflect a relationship between the set of EV control parameters and the set of simulated target-vehicle controls; and outputting the set of simulated target-vehicle controls to the EV, such that the EV is controlled to achieve the plurality of target behaviors of the target vehicle based on the set of simulated target-vehicle controls.

Another aspect of the present disclosure provides a simulating system for an electric vehicle (EV). The simulating system may include a plurality of input devices providing a plurality of vehicle parameters, a memory containing program instructions, and a processor coupled to the memory and the plurality of input devices. When executing the program instructions, the processor is configured to: create a simulation model associating a plurality of target behaviors of a target vehicle with the EV; obtain a plurality of vehicle parameters of the EV to generate a set of EV control parameters; obtain a plurality of configuration parameters of the target vehicle; based on the set of EV control parameters and the plurality of configuration parameters of the target vehicle, use the simulation model to provide a set of simulated target-vehicle controls, wherein the simulation model is a neural network trained to reflect a relationship between the set of EV control parameters and the set of simulated target-vehicle controls; and output the set of simulated target-vehicle controls to the EV, such that the EV is controlled to achieve the plurality of target behaviors of the target vehicle based on the set of simulated target-vehicle controls.

Another aspect of the present disclosure provides an electric vehicle (EV). The EV may include a battery pack for providing power to the EV; a set of wheels; at least one electric motor coupled to the battery pack for providing driving power to the set of wheels to drive the EV; and an onboard computer system for performing: creating a simulation model associating a plurality of target behaviors of a target vehicle with the EV; obtaining a plurality of vehicle parameters of the EV to generate a set of EV control parameters; obtaining a plurality of configuration parameters of the target vehicle; based on the set of EV control parameters and the plurality of configuration parameters of the target vehicle, using the simulation model to provide a set of simulated target-vehicle controls, wherein the simulation model is a neural network trained to reflect a relationship between the set of EV control parameters and the set of simulated target-vehicle controls; and outputting the set of simulated target-vehicle controls to the EV, such that the EV is controlled to achieve the plurality of target behaviors of the target vehicle based on the set of simulated target-vehicle controls.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions in embodiments of the present disclosure, the drawings used in the description of the disclosed embodiments are briefly described hereinafter. Other drawings may be derived from such drawings by a person with ordinary skill in the art without creative efforts and may be encompassed in the present disclosure.

FIG. 5C illustrates a block diagram of an exemplary driver profile according to embodiments of the present disclosure;

DETAILED DESCRIPTION OF THE EMBODIMENTS

Technical solutions of the present disclosure will be described below with reference to the accompanying drawings. It should be understood that the embodiments are provided to enable a more thorough understanding of the present disclosure and to fully convey the scope of the present disclosure to those skilled in the art, and the present disclosure can be implemented in various forms and should not be limited by the embodiments set forth herein.

In the embodiments of the present disclosure, a sentence like "A and B are connected" may include situations where A and B are connected with each other and are in contact with each other or where A and B are connected through another component and without directly contacting with each other. Also, terms such as "first" and "second" are used to distinguish similar objects and are not necessarily used to describe a specific sequence or order.

Figure 1:
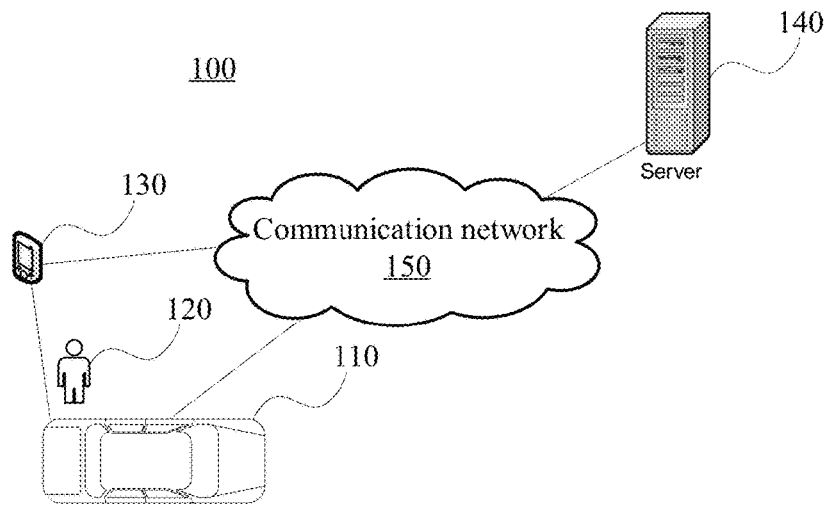
FIG. 1 illustrates an exemplary operation environment incorporating certain embodiments of the present disclosure.

New to most consumers, an electric vehicle (EV) often offers a new driving experience for a driver of the EV. Some drivers may find the EV driving experience interesting and exciting, while some other drivers may miss the driving experience of more traditional vehicles, especially those high-performance internal combustion engine (ICE) vehicles, such as Mercedes AMG series vehicles. Thus, for an EV with sufficient capabilities, an onboard simulating method may be provided for the EV to simulating certain ICE vehicle characteristics to enhance the driving experience of the EV. That is, according to the present disclosure, an electric vehicle (EV) may be provided with an onboard simulating system for simulating certain characteristics of a target vehicle. FIG. 1 illustrates an exemplary operation environment incorporating certain embodiments of the present disclosure.

As shown in FIG. 1, the operating environment 100 may include an EV 110, a driver/user 120, a user terminal 130, a cloud server 140, and a communication network 150. Any number of EV, user, user terminal, server, and/or communication network may be included, and other components may also be included. The EV 110 may include any vehicle operated on a battery power source, such as pure or hybrid electric vehicles, including automobile, aerial or water vehicles, etc. For example, the EV 110 may include a battery pack for providing power to the EV 110, a set of wheels, at least one electric motor couple to the battery pack for providing driving power to the set of wheels to drive the EV 110, a wireless communication device for connecting to a cloud server and/or a mobile device carried by the driver of the EV 110, and an onboard computer system for performing a simulation of the target vehicle on the EV 110. The wireless communication device also provides a wireless connection to the internet for synchronizing profiles and reporting errors and logs. The driver 120 may be driving the EV 110, which may be owned by the driver 120, or may be owned by someone else and is only driven by the driver 120. The user terminal 130 may include any portable user devices, such as smart phones, personal digital assistant (PDA), notebooks, laptops, or a combination of vehicle equipment and user devices, such as Apple Car Play or the like. Any portable device may be included as the user terminal 130. Further, the user terminal 130 may be carried or owned by the driver 120, or may be placed in or as a part of the EV 110.

Further, the communication network 150 may include any type of communication network, such as wired and/or wireless network to connect the EV 110 and/or user terminal 130 to the Internet or to the cloud server 140. The cloud server 140 may be provided by a commercial entity for managing, monitoring, maintaining, or servicing the EV 110, such as a dealership or a vehicle manufacturer, or a service provider for EV related services. The cloud server 140 may store certain data needed for the simulation and may perform calculation offloaded from the EV 110.

Figure 2:
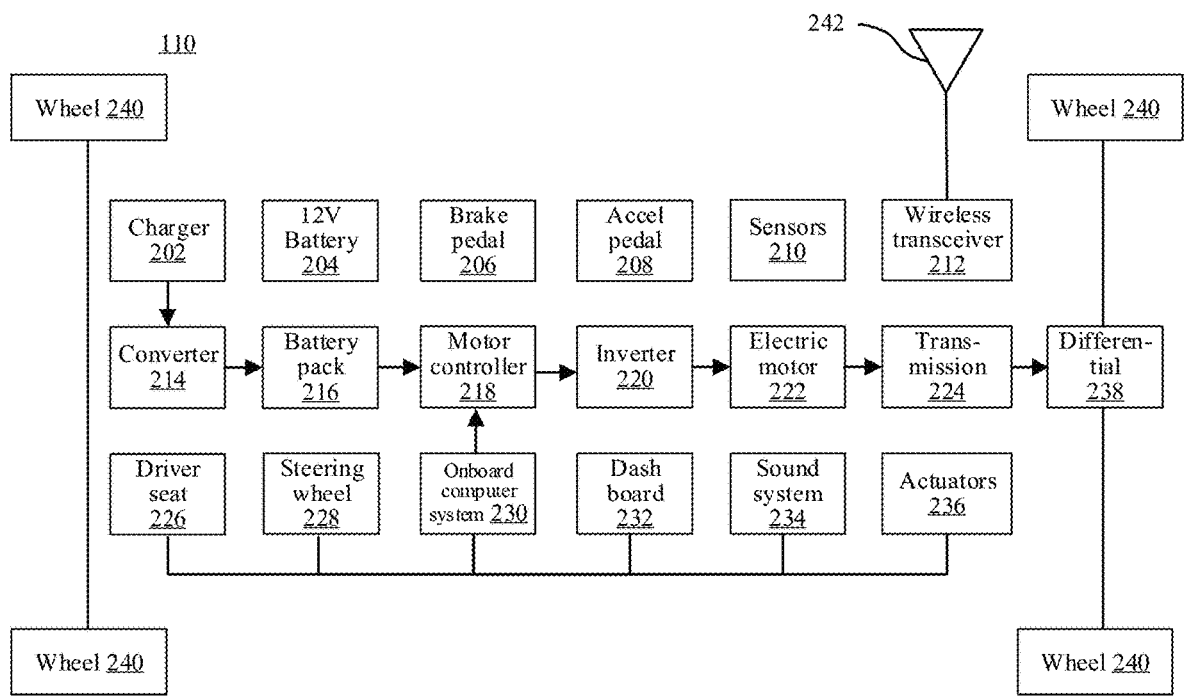
FIG. 2 illustrates a block diagram of an exemplary electric vehicle (EV) according to embodiments of the present disclosure.

FIG. 2 illustrates a block diagram of an exemplary electric vehicle (EV) according to embodiments of the present disclosure. As shown in FIG. 2, the electric vehicle 110 may include a variety of subsystems or components. Specifically, the EV 110 may include a plurality of wheels 240, an electric motor 222, an acceleration pedal 208, a brake pedal 206, a differential 238, a battery pack 216, an onboard computer system 230, a motor controller 218, a steering wheel 228, a driver seat 226, a dashboard 232, a sound system 234, and actuators 236. The EV 110 may also include a charger 202, a converter 214, a 12V battery 204, sensors 210, a wireless transceiver 212, an antenna 242, a transmission 224, and an inverter 220, etc. Any number of these subsystems or components may be included, certain components may be removed, and other components may be included.

The onboard computer system 230 may control various components of the EV 110. The charger 202 may charge the battery pack 216 through a converter 214 to convert an alternate current (AC) or a direct current (DC) input to a proper charging source. The charger 202 may an onboard charger of the EV 110. The onboard charger may be a level 1 charger that receives 120 VAC output from a wall outlet. The EV 110/the battery pack 216 can also be charged by an external level 2 or level 3 charger that can use a high voltage AC power source to charge the battery pack 216 more quickly than the onboard changer.

In some embodiments, the battery pack 216 may include a battery thermal management system to heat the battery pack 216 when a temperature of the battery pack 216 is below a predefined low temperature threshold or to cool the battery pack 216 when the temperature of the battery pack 216 is above a predefined high temperature threshold. The battery pack 216 operates more effectively when the temperature of the battery pack 216 is within a range between the predefined low temperature threshold and the predefined high temperature threshold.

An output of the battery pack 216 may be fed into the motor controller 218 to control the electric motor 222. The output of the battery pack 216 may pass through the inverter 220. The inverter 220 may adjust a voltage of the battery pack 216 into a voltage suitable for driving the electric motor 222. An output of the electric motor 222 may pass through the transmission 224 and the differential 238 to drive the wheels 240.

Further, the electric motor 222 may include a stator and a rotor (not shown in FIG. 2). The stator is a stationary outer shell of the electric motor 222 mounted to a chassis of the EV 110. The rotor is a rotating element and feeds a torque to the transmission 224 of the EV 110. The transmission 224 of the EV 110 adjusts a rotation speed of the rotor before using the torque of the rotor to drive the differential 238 of the EV 110. The differential 238 of the EV 110 distributes the torque to the wheels 240 according to certain proportions suitable for a driving condition.

The EV 110 may include more than one electric motor 222. For example, the EV 110 may include two electric motors 222. One electric motor 222 drives two front wheels 240 and another electric motor 222 drives two rear wheels 240. In another example, the EV 110 may include four electric motors 222. Each of the four electric motors 222 drives each of the four wheels 240, respectively. The differential 238 can be removed when each wheel 240 is directly driven by one electric motor 222. A tire (not shown) may be mounted on each wheel 240.

Further, the acceleration pedal 208 and the brake pedal 206 may be provided and placed to accelerate and decelerate the EV 110. The sensors 210 and actuators 236 may be provided to facilitate the acceleration and deceleration. For example, the sensors 210 may detect positions of the acceleration pedal 208 and the brake pedal 206, and make the positions thereof available to the onboard computer system 230. The onboard computer system 230 controls the electric motor 222 through the motor controller 218 and the inverter 220 according to the positions of the acceleration pedal 208 and the brake pedal 206. The actuators 236 may be controlled by the onboard computer system 230 to dynamically adjust suspension of the EV 110 based on conditions of the EV 110. In some embodiments, the actuators 236 may be controlled by the onboard computer system 230 to adjust stiffness of the acceleration pedal 208 and the brake pedal 206.

The EV 110 also may provide the driver 120 with certain vehicle interaction using the sound system 234 and the dashboard 232. For example, in addition to playing music and radio channels, the sound system 234 may be controlled by the onboard computer system 230 to simulate an engine sound. The dashboard 232 may controlled by the onboard computer system 230 to display certain information to the driver 120, including an image of a dashboard of another vehicle.

The 12V battery 204 may be used to provide auxiliary power to various components of the EV 110, such as the onboard computer system 230, the dashboard 232, the sound system 234, the sensors 210, the actuators 236, the wireless transceiver 212, and other control circuits.

The wireless transceiver 212 may be connected to the antenna 242. The wireless transceiver 212 may facilitate communications between the onboard computer system 230 and the cloud server 140 and the user terminal 130 shown in FIG. 1. The wireless transceiver 212 may include a cellular communication transceiver supporting 3G/4G/5G cellular communications to communicate with the cloud server 140 and a Bluetooth/Wi-Fi transceiver to communicate with the user terminal 130. Other wireless communication formats may also be used.

The EV 110 may provide an individual (e.g., the driver 120 or another passenger in the EV) with the steering wheel 228 and the driver seat 226 for driving the EV 110. For example, the driver 120 of the EV 110 sits in the driver seat 226 and uses the steering wheel 228 to steer a driving direction of the EV 110. In one embodiment, a speaker (not shown) may be placed under the driver seat 226 to play simulated engine sound to the individual, or play a low frequency sound to simulate vibration caused by a gas engine. The EV 110 may also include a global positioning system (GPS) device (not shown) to detect a current location of the EV 110.

The current location may be used to determine local traffic/safety rules and regulations. The local traffic/safety rules and regulations are used in performing a safety check on controlling the EV 110.

Figure 3A:
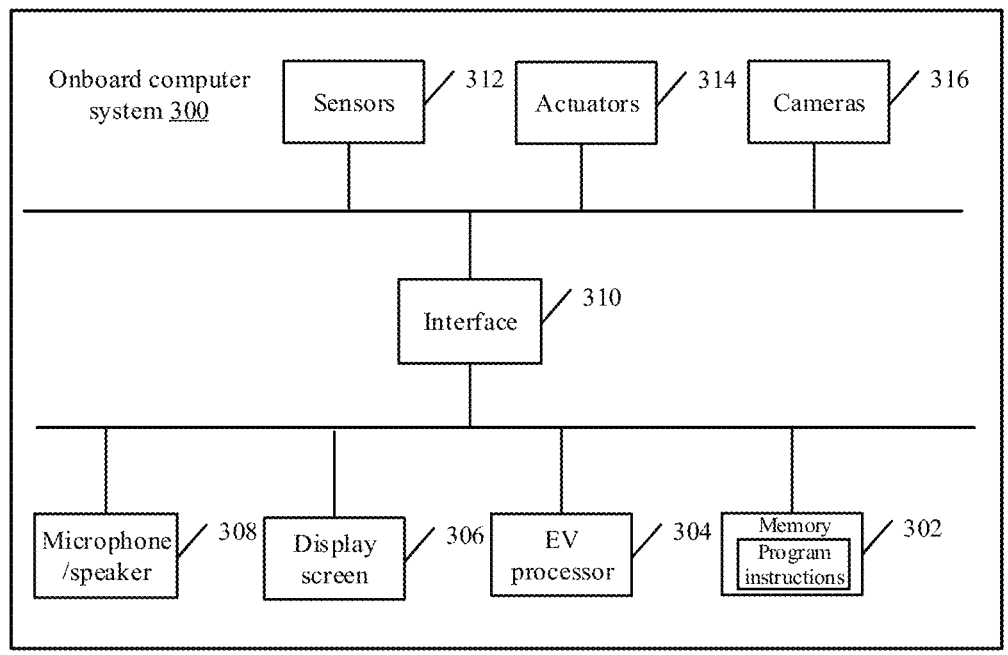
FIG. 3A illustrates a block diagram of an exemplary onboard computer system according to embodiments of the present disclosure.

In operation, the onboard computer system 230 may obtain a plurality of configuration parameters from one or more of a memory storage device of the onboard computer system, the cloud server, and the mobile device carried by the driver of the EV 110. The onboard computer system 230 may perform various control functions for the EV 110, and may also perform a simulating process to simulate certain vehicle behaviors of another vehicle. When performing the simulating process, the onboard computer system may offload some or all of the simulating process to the cloud server to limit energy consumption at the EV 110. FIG. 3A illustrates a block diagram of an exemplary onboard computer system according to embodiments of the present disclosure. As shown in FIG. 3A, the computer system 300/onboard computer system 230 may include a processor 304, a memory 302, a display screen 306, a microphone/speaker 308, an interface 310, sensors 312, actuators 314, and cameras 316, etc. The computer system 300 can be the onboard computer system 230 shown in FIG. 2. Certain devices may be omitted and other devices may be included.

The memory 302 may store program instructions. The program instructions perform an onboard simulating method for the EV 110 when executed by the processor 304. In some embodiments, the memory 302 may include a dynamic random-access memory (DRAM), an embedded multimedia controller (e.MMC), a low-power DRAM (LPDRAM), a NOR flash memory, a single-level cell (SLC) NAND flash memory, a solid-state drive (SSD), a universal flash storage (UFS) device, or a combination thereof.

In some embodiments, the processor 304 may be one or more hardware processors, microprocessors, and microcontrollers, distributed over various parts of the EV. For example, the processor 304 may include a vehicle network processor dedicated for intra-vehicle network, a vision processor dedicated for vision processing, a radar processor dedicated for radar processing, a processor for engine control, a graphic processing unit (GPU) for dashboard rendering, an audio digital signal processor (DSP) for audio processing, a communication processor for supporting wireless communication such as 5G mobile, an artificial intelligence processor for implementing a neural network, or combination thereof. In some embodiments, certain computing tasks described above may be offloaded to the cloud sever to keep the computing power available for EV operations. Accordingly, the cloud server will return results to the EV upon completion of the computing tasks offloaded from the EV 100.

The computer system 300 may also include the display screen 306 and the microphone/speaker 308 to interact with the user 120 of the computer system 300. The display screen 306 is a part of a human-machine interface (HMI) to facilitate interactions between the driver 120 and the computer system 300. The HMI may include an infotainment system and an instrument cluster. The display screen 306 may include any appropriate type of computer display device or electronic device display. For example, the display screen 306 may include an LCD display device, an OLED display device, or a combination thereof. The display screen 306 may be a touch-control display screen. The display screen 306 may include a gesture sensor for gestures of a hand of the individual (e.g., driver 120, passenger) in front of the display screen 306. The display screen 306 may also include a haptic driver to provide haptic feedbacks. The display screen 306 may also include a head-up display (HUD) that provides information to the driver 120 at an eye level. The display screen 306 may include a transparent window display that uses a projector mounted inside the EV 110 to project images to a transparent film sandwiched or laminated in a window of the EV 110. The microphone/speaker 308 allows the individual to interact with the computer system 300 using voice instructions. The microphone/speaker 308 may include an active noise cancellation function. The computer system 300 may also include other peripherals for interacting with the individual.

The computer system 300 may use the interface 310 to connect various accessories, such as sensors 312, actuators 314, and cameras 316. The interface 310 may include a vehicle interface processor (VIP). The sensors 312 and the actuators 314 may be the sensors 210 and the actuators 236 shown in FIG. 2. The computer system 300 may include an internal bus to connect the memory 302, the processor 304, the display screen 306, the microphone/speaker 308, and the interface 310 together. The interface 310 may be connected to the sensors 312, the actuators 314, and the cameras 316 through the internal bus. For example, the internal bus may be a controller area network (CAN) bus, a FlexRay bus, a media-oriented system transport (MOST) bus, an automotive Ethernet bus, a local interconnect network (LIN) bus, or a combination thereof. The internal bus may also be used to connect other accessories that are not shown in FIG. 3A.

Figure 3B:
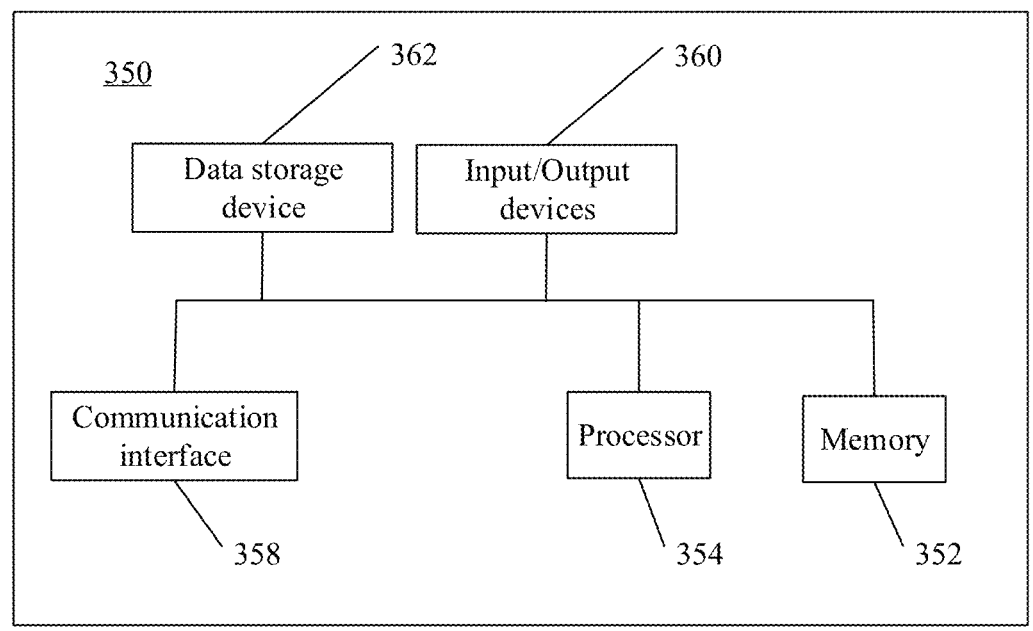
FIG. 3B illustrates a block diagram of an exemplary computer system according to embodiments of the present disclosure.

Returning to FIG. 1, in operation, the user terminal 130 and/or cloud server 140 may interact with the EV 110 or the onboard computer system 230 through the communication network 150 to perform certain user or server processes. FIG. 3B illustrates a block diagram of an exemplary computer system according to embodiments of the present disclosure. The computer system 350 can be the cloud server 140 shown in FIG. 1.

As shown in FIG. 3B, the computer system 350 may include a memory 352, a processor 354, a communication interface 358, input/output devices 360, and a data storage device 362, etc. Other devices may also be included. The processor 354 may include any appropriate hardware processor or processors. Further, the processor 354 can include multiple cores for multi-thread or parallel processing and can include graphics capability for processing for a human-machine interface (HMI) (i.e., an example of input/output devices 360). The memory 352 may include any appropriate memory modules, such as ROM, RAM, flash memory modules, and erasable and rewritable memory, and mass storages, such as CD-ROM, DVD, U-disk, and hard disk, etc. The memory 352 may store computer program instructions or program modules for implementing various processes, when executed by the processor 354, to perform interactions with the onboard computer system 230 on the EV 110.

Further, the computer system 350 may further include a display. The display may be any suitable display technology suitable to display an image or a video. For example, the display may include a liquid crystal display (LCD) screen, an organic light-emitting diode (OLED) screen, or the like, and may be a touch screen. The communication interface 358 may include certain network interface devices for establishing connections through communication networks. The input/output devices 360 may include any appropriate input devices to input information to the processor 354 and/or output devices to output information from the processor 354, such as keypads, keyboards, and mouse devices, cameras, microphones, and other sensors, etc. Further, the data storage device 362 may include one or more data storage devices for storing certain data and for performing certain operations on the stored data, such as database searching, model training, etc. Due to limited memory size of the onboard computer system 230, the data needed for the simulation may be stored in the data storage device 362. When needed, the data for the simulation may be downloaded by the onboard computer system 230 from the data storage device 362. Further, the local regulations and/or rules may prevent data from leaving the EV 110 without certain restrictions. The data may be tokenized, encrypted, and purged before being transmitted to the cloud server 140. Personally identified information needs to be protected regardless of being stored in the onboard computer system 230 or being transmitted to the cloud server 140. In any case, the data handling needs to be consistent with a driver's consent or a service agreement signed by the driver. In some embodiments, local regulations and/or rules may restrict data collected by the EV and data leaving the EV. The data collected by the EV and the data leaving the EV may be tokenized, encrypted, and purged to ensure personal identifiable information (PII) data is properly handled. The data collected by the EV and the data leaving the EV are handled, used, and stored according to driver's consent and preference.

Returning to FIG. 1, in operation, the EV 110 may be driven by the driver 120. After the driver 120 enters the EV 110, the driver 120 may interact with the onboard computer system 230 of the EV 110 to provide an input to the onboard computer system 230 such that the onboard computer system 230 may perform a simulating process to simulate certain vehicle behaviors, actions, and/or characteristics of a target vehicle on the EV 110. The input may include user information and/or configuration information. The term "simulating", as used herein, may refer to a process to acquire static and/or dynamic parameters for the EV 110 for realizing the certain vehicle behaviors, actions, and/or characteristics of a target vehicle on the EV 110 and to safely control the EV 110 to realize the certain vehicle behaviors, actions, and/or characteristics of the target vehicle.

For example, the target behavior of the target vehicle may include vehicle handling characteristics, gear shifting, dynamic engine sound and vibration to a driver seat, a simulated dashboard of the target vehicle, and a combination thereof. The vehicle handling characteristics may reflect how the vehicle responds and reacts to driver inputs of the vehicle and at least include weight distribution of the vehicle and cornering stiffness of tires of the vehicle. The weight distribution of the vehicle may include a center of mass height, a center of mass, roll angular inertia, and yaw and pitch angular inertia. Other factors that contribute to the vehicle handling characteristics include rigidity of a vehicle frame, an electronic stability control, a precision of steering, delivery of power to wheels, an effect of braking, vehicle body aerodynamics, and a spring rate of vehicle suspension, etc.

In an internal combustion engine (ICE) vehicle, gasoline is burnt to cause mechanical movements to move the ICE vehicle, and the gear shifting is used to adapt a vehicle transmission to various vehicle speeds. The gear shifting in the ICE vehicle causes abrupt changes in torque. Unlike the ICE vehicle, an EV uses one or more electric motors to drive the wheels of the EV. The one or more electric motors can be controlled electrically to drive the wheels of the EV at various vehicle speeds without requiring the gear shifting. Recreating the gear shifting resulting in abrupt changes in the torque is an aspect of the simulation of the behavior of the target vehicle.

Further, when in operation, a gasoline engine of the ICE vehicle makes loud noise and causes the ICE vehicle to vibrate. On the other hand, the one or more electric motors of the EV do not make the loud noise and do not cause the EV to vibrate. To simulate the behavior of the target vehicle, the EV may need to recreate the dynamic engine sound and vibration, which may be limited to a space surrounding the driver seat.

The target vehicle is not necessarily an ICE vehicle, a different EV or other type vehicle may also be the target vehicle to be simulated on the EV 110. In another aspect of the simulation, different vehicles often include different dashboards. The simulation of the behavior of the target vehicle may include recreating the dashboard of the target vehicle. When the EV may include one or more display screens at a position of the dashboard, the EV controls the one or more display screens to render the dashboard of the target vehicle. For example, when the target vehicle is another EV, the simulated dashboard of the another EV may be displayed at the EV so that the driver 120 may have the feel of the another EV when looking at the dashboard. In some embodiments, critical information unique to the EV (i.e., remaining battery charge) needs to be shown. When the simulation is in operation, the critical information may be shown in an original format of the EV or in a different format. In addition, dashboard customization may be facilitated such that the driver can display certain information (i.e., navigation information) that may not have been on the display of the target vehicle.

Figure 4:
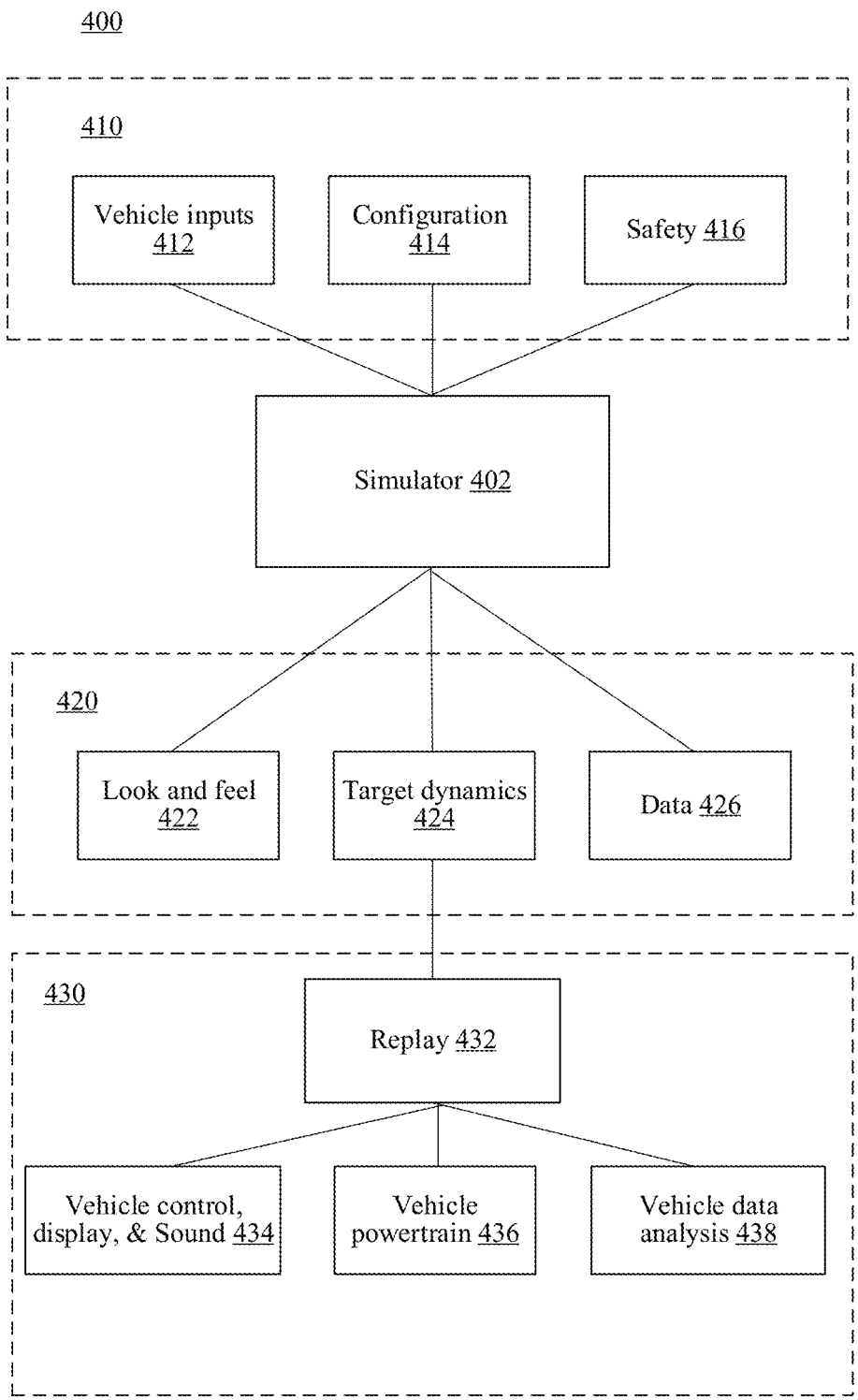
FIG. 4 illustrates a block diagram of an exemplary simulating system for an EV according to embodiments of the present disclosure.

A variety of other behaviors, actions, and/or characteristics of the target vehicle may be simulated on the EV 110. The simulating process may be implemented as a simulation software running on the onboard computer system 230, or a combination of software and hardware implemented by the onboard computer system 230 or running on both the onboard computer system 230 and the cloud server 140, or a combination of software and hardware implemented by the onboard computer system 230 and/or the cloud server 140. That is, the onboard computer system 230 and/or the cloud server 140 may implement a simulating system on the EV 110 to perform the simulating process based on the request of the driver 120. FIG. 4 illustrates a block diagram of an exemplary simulating system for an EV according to embodiments of the present disclosure.

Figure 5A:
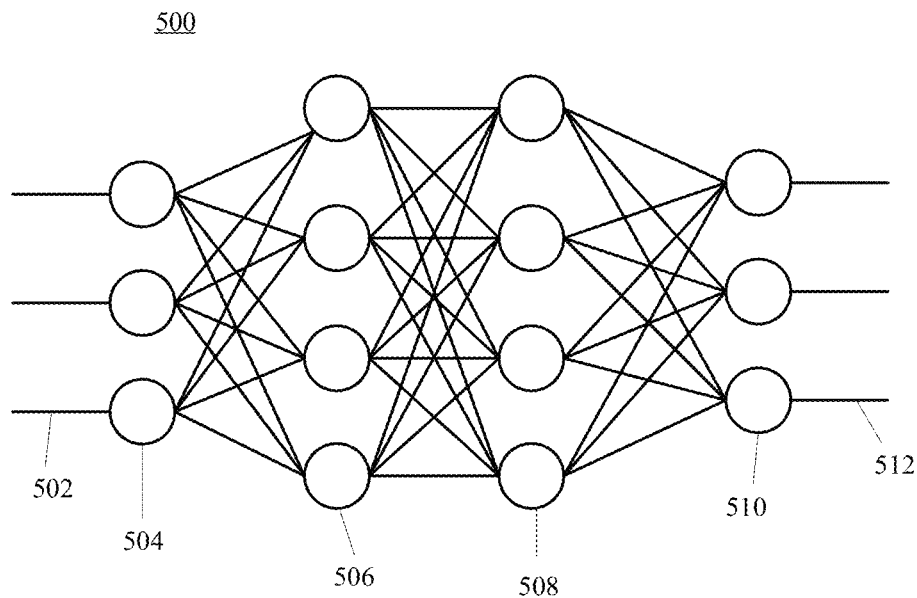
FIG. 5A illustrates a block diagram of an exemplary simulator model according to embodiments of the present disclosure.

As shown in FIG. 4, the simulating system 400 may include a simulator 402, a plurality of input modules 410, a plurality of output modules 420, and a plurality of action modules 430, etc. Other modules may also be included. The simulator 402 may include any appropriate mathematical model or algorithm to generate certain simulation output parameters based on input parameters. FIG. 5A illustrates a block diagram of an exemplary simulator model according to embodiments of the present disclosure.

As shown in FIG. 5A, the simulator 402 may include a neural network model 500. In this specification, the neural network model 500 is also called a vehicle simulator model. The vehicle simulator model is trained to reflect a relationship between the plurality of vehicle parameters and the plurality of configuration parameters as inputs and the one or more control parameters as outputs. Other types of artificial intelligent/machine learning model may also be used. The neural network model 500 may be a deep learning network model or a combination of multiple machine learning models, and may include an input layer 504, middle layers 506 and 508 (hidden layers), and an output layer 510, etc. The hidden layers may also include a convolutional layer when a convolutional neural network is included. Further, the neural network model 500 may also include a generative adversarial network for desired performance improvement. Further, input 502 may be provided to the input layer 504, and output 512 may be provided by the output layer 510. Each layer may include one or more neural-network node. The number of the neural-network layers are used for illustrative purposes, any number of the neural-network layers may be used. The parameters of the neural network model 500 may be obtained by the onboard computer system 230 and may also be stored/transferred from the cloud server 140.

The neural network model 500 may be first trained, for example, by the cloud server 140 to establish the simulator 402. For example, the cloud server 140 may obtain historical data of the target vehicle (e.g., vehicles of the same type of the target vehicle) and of the EV 110 as values for the input 502 and the output 512 to train the neural network model 500. The cloud server 140 may also obtain vehicle data during operation and data of the driver 120 to train the neural network model 500. For example, the vehicle data may include usage statistics such as simulation duration, location, and activation frequency, and error logs such as instances when the simulator 402 fails to initialize or is deactivated by a safety module shown in FIG. 4 during the operation. In some embodiments, the cloud server 140 may only extract a portion of the vehicle data that can be used to train the vehicle simulator model. In this way, an amount of the collected data can be reduced to preserve energy at the EV and minimize communication network usage. In some embodiments, because the local regulations and rules may limit what data is allowed to leave the EV, the data extraction by the cloud server 140 may be limited or may require a prior consent by a person (e.g., an owner) who has the authority over the EV.

For example, in some embodiments, the input 502 may include a plurality of vehicle parameters of the EV including run-time parameters of the EV. A run-time parameter of the EV may be a parameter which describes or affects run-time behavior of the vehicle, where the run-time behavior may refer to the vehicle being driven. For example, the run-time parameters of the EV at least include the steering wheel position, the vehicle weight distribution, the road surface condition, the shock distribution, the brake position, the torque vector, and the battery availability; and the output 512 may include one or more control parameters including the target turn angle, the target steering ratio, the target weight distribution, and the target wheelbase. The input 502 may further include driving conditions of the EV. For example, the driving conditions of the EV include at least location, data from rain/fog sensors, and camera feeds to understand terrain. The input 502 may further include local regulations and rules.

In another embodiment, the input 502 may include a plurality of vehicle parameters of the EV including the acceleration pedal position, the steering wheel position, the road surface condition, the observed traction, the available power, the motor temperature, the battery temperature, the gyro measurement, the accelerator measurement, the suspension position, the throttle position, the brake position, and the regeneration settings; and the output 512 may include one or more control parameters including the target acceleration or deceleration, the target drive wheels, the target traction settings, and the target handling characteristics.

In another embodiment, the input 502 may include a plurality of vehicle parameters of the EV including the acceleration pedal position and the window position; and the output 512 may include one or more control parameters including the target engine sound at least at a driver side of the EV 110. All appropriate input parameters and out parameters may be used.

After the neural network model 500 is trained, the neural network model 500 may be loaded to the onboard computer system 230 of the EV 110, for example, by retrieving from the cloud server 140 through the communication network 150 or by storing the model data locally on the EV 110.

Returning to FIG. 4, the plurality of input modules 410 may include several modules configured to provide input parameters based on a specific type of the input parameters. Specifically, the plurality of input modules 410 may include a vehicle inputs module 412, a configuration module 414, and a safety module 416. Other modules may also be included.

The vehicle inputs module 412 may provide input parameters related to the vehicle itself, i.e., the EV 110 or the host vehicle. That is, the vehicle inputs module 412 may provide values of a plurality of vehicle parameters of the EV 110. The plurality of vehicle parameters may include torque parameters, weight distribution, steering parameters, acceleration and deceleration parameters, and suspension parameters.

The torque (pound-feet or newton-meters) is an amount of pulling power the electric motor 222 produces while the acceleration pedal 208 is pressed by the driver 120 of the EV 110. The horsepower refers to the power the electric motor 222 produces. The weight distribution is an amount of a total vehicle weight imposed on the ground at an axle, group of axles, or an individual wheel. The weight distribution affects how quickly a vehicle accelerates and decelerates and how well the vehicle handles when cornering. This is because of the weight transfers that occur when the vehicle is moving, affecting levels of tire grip.

The steering parameters include a steering wheel position, a brake pedal position, a shock position, vehicle weight distribution, a torque vector, road surface condition, battery availability, or a combination thereof. The acceleration and deceleration parameters include the steering position, the road surface condition, observed traction, available power, a motor temperature, a battery pack temperature, a gyro measurement, an accelerator measurement, a suspension position, a throttle position, the brake pedal position, regen settings, or a combination thereof. Some parameters may appear in more than one of the steering parameters, the acceleration and deceleration parameters, and the suspension parameters. Other parameters may also be included. Further, the vehicle inputs module 412 may provide the vehicle parameters in real time during the operation. Alternatively, the vehicle inputs module 412 may provide stored vehicle parameters. Some vehicle parameters are dynamically changing and can be obtained from sensors of the EV 110. Some other vehicle parameters are static and can be obtained from an EV data storage device at the cloud server. Accordingly, the onboard computer system 230 may obtain the plurality of vehicle parameters of the EV 110 locally and/or remotely from the could server.

Further, the configuration module 414 may provide input parameters related to the configuration of the simulation, i.e., the behavior of the target vehicle. That is, the configuration module 414 may provide values of a plurality of target vehicle parameters and/or information about the driver, i.e., the configuration parameters. The plurality of configuration parameters at least includes information of the target vehicle and settings of the target vehicle for the driver. For example, the configuration module 414 may obtain a target profile of the target vehicle and/or a driver profile of the driver of the EV 110 and determine the configuration parameters for the simulation. Other information may also be included.

Figure 5B:
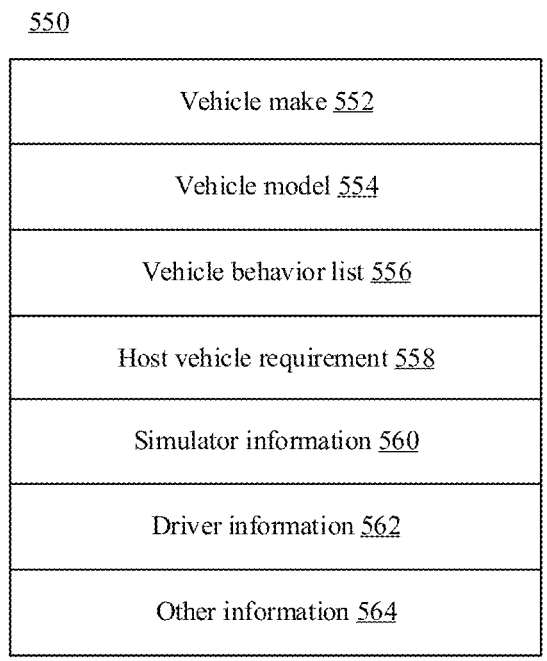
FIG. 5B illustrates a block diagram of an exemplary target profile according to embodiments of the present disclosure.

The target profile may include information for configuring the simulation. FIG. 5B illustrates a block diagram of an exemplary target profile according to embodiments of the present disclosure. As shown in FIG. 5B, the target profile 550 may include a vehicle make 552, a vehicle model 554, a vehicle behavior list 556, a host vehicle requirement 558, simulator information 560, driver information 562, and other information 564. Certain information item may be omitted, and other information item may be added.

The vehicle make 552 may indicate the make of the target vehicle, and the vehicle model 554 may indicate the model of the target vehicle. The vehicle behavior list 556 may indicate one or more vehicle behaviors or parameters to be simulated. For example, the target profile of the target vehicle may include horsepower/torque curves, suspension rates/type/programming, a steering ratio, a wheelbase, a vehicle type, a speed-fuel consumption curve, dashboard data, control weights for steering, acceleration pedal feel, and brake pedal feel, braking figures, or a combination thereof.

For an ICE vehicle, the torque is equal to the horsepower times a constant (e.g., 5,252) divided by a rotation speed (round per minute or RPM). Due to the gear shifting, a torque over time curve of the ICE vehicle looks like a sawtooth curve. As a driver of the ICE vehicle presses a gas pedal of the ICE vehicle, the torque increases over time, and then drops sharply when the gear shifting occurs. Unlike the ICE vehicle, the EV does not need the gear shifting and has a torque over time curve that goes up initially and stays up as long as the driver 120 of the EV continues to press the acceleration pedal 208. The EV and the ICE vehicle behave substantially differently in response to driver's pressing of the acceleration pedal or gas pedal. The gear shifting behavior of the ICE vehicle is simulated by the onboard computer system 230 of the EV 110 to make the driver 120 of the EV 110 feel the gear shifting behavior of the ICE vehicle.

The suspension may include an active suspension of the target vehicle that controls a vertical movement of the wheels of the target vehicle relative to a chassis of the target vehicle or target vehicle body, or a passive suspension provided by large springs where the vertical movement is determined entirely by a road surface. The active suspension may vary shock absorber firmness to match changing road or dynamic conditions or may use the actuator to raise and lower the chassis independently at each wheel. The suspension may be a spring type suspension, and the suspension rate may be called a spring rate. The spring rate is a component in setting a ride height of the vehicle. When a spring is compressed or stretched, a force it exerts is proportional to its change in length. The spring rate is a change in the force it exerts divided by the change in deflection of the spring. The spring rate may be programmed to adapt to a weight of the vehicle. Thus, the behavior of the suspension of the target vehicle needs to be simulated on the EV 110.

The steering ratio refers to a ratio between a turn of a steering wheel in degrees and a turn of the wheels in degrees. A higher steering ratio means that the steering wheel is turned more to get the wheels turning, but it will be easier to turn the steering wheel. A lower steering ratio means that the steering wheel is turned less to get the wheels turning, but it will be harder to turn the steering wheel. Thus, the behavior of the steering wheel of the target vehicle needs to be simulated on the EV 110.

The wheelbase is a horizontal distance between centers of front and rear wheels. When the vehicle accelerates, the rear of the vehicle often sinks and the front of the vehicle rises depending on the suspension. When the vehicle decelerates, the rear of the vehicle often rises and the front of the vehicle sinks depending on the suspension. The relative rise and fall of the front and the rear of the vehicle and the wheelbase together affect the weight distribution of the vehicle as well as the feel of driving the vehicle. Thus, the behavior of the wheelbase of the target vehicle needs to be simulated on the EV 110.

The vehicle type may include a sedan type, a GT type, and a sports utility vehicle (SUV) type. The vehicle type affects the feeling of driving the vehicle and plays a role in simulating the behavior of the target vehicle on the EV 110. The speed-fuel consumption curve is used to estimate fuel consumption of the target vehicle. When the driver 120 drives the EV 110 operated in the simulation mode, the estimated fuel consumption of the target vehicle can be displayed on the dashboard.

The dashboard data refer to data that appear on the dashboard of the target vehicle. Certain dashboard data of the target vehicle may no longer be applicable for the EV 110, but will still be estimated and presented to the driver 120 on the dashboard of the EV 110, such that the driver 120 of the EV 110 feels like driving the target vehicle. The control weights for steering are used in four-wheel steering to improve the agility and stability of turning at various vehicle speeds. When the driver 120 turns the steering wheel at low speeds, the front wheels turn in a direction of travel while the rear wheels turn in the opposite direction, effectively reducing a turning radius of the vehicle and making low speed maneuvers quicker and easier. Steering at higher speeds turns both the front and rear wheels in the same direction for increased high-speed stability. This steering behavior of the target vehicle may be simulated on the EV 110. For certain ICE profiles, the four-wheel steering behavior at higher speed may be disabled. For example, the four-wheel steering may be disabled for safety reasons when the speed of the EV exceeds a pre-determined speed threshold.

The acceleration pedal feel and the brake pedal feel vary from vehicles to vehicles. The driver 120 often remembers the acceleration pedal feel and the brake pedal feel of the target vehicle. The acceleration pedal feel and the brake pedal feel of the target vehicle need to be simulated on the EV 110. The braking figures include a braking distance or a stopping distance. The braking distance refers to a distance the vehicle will travel from a point when the brake pedal is fully pressed to a point when the vehicle stops completely. The braking distance is primarily affected by the vehicle speed and a coefficient of fiction between the tires and the road surface. The braking figures of the target vehicle need to be simulated on the EV 110. In addition, for safety reasons, a maximum braking ability of the EV is always available in the event of an emergency situation. The emergency situation may include, but is not limited to, tire blowout, headlight malfunction, stuck throttle/accelerator, engine stall, collision imminent, wildlife in the road, and driving off the road.

Further, as shown in FIG. 5B, the host vehicle requirement 558 may indicate one or more requirements for the host vehicle in order to perform the simulation, such as horsepower, powertrain configuration, etc. The simulator information 560 may indicate specific information on the simulator for simulating the target vehicle, and the driver information 562 may be used to locate the target profile when the driver identification may be used to search and locate the target profile. Other information 564 may be used for other user or vehicle specific information.

Further, a driver profile may include information specifically about the driver 120 to facilitate the simulating process. FIG. 5C illustrates a block diagram of an exemplary driver profile according to embodiments of the present disclosure. As shown in FIG. 5C, the driver profile 580 may include a driver identification 582, driver personal information 584, driver vehicle information 586, driver account information 588, driver social media information 590, a target profile list 592, and other information 594. Certain information item may be omitted, and other information item may be added.

The driver identification 582 may indicate an identification of the driver 120, which may be used to search the database. The driver personal information 584 may include personal information about the driver 120, such as weight, gender, age, address, location, and profession, etc. The driver vehicle information 586 may include the driver's vehicle specific information, such as vehicle registration, vehicle garage information, and vehicle usage information, etc. The driver account information 588 may include login information for accessing the cloud server 140, and the driver social media information 590 may include information about the driver's social network presence, such as driver's social media access information for sharing recorded trip data, etc. The recorded trip data may include the data of the simulation including information about the selected ICE profile. The data of the simulation in the recorded trip data shared by the driver on the social media may be used as the training dataset to train the simulation model. The target profile list 592 may include one or more target profiles that the driver may use or may choose to perform the simulation, and each target profile may be individually selected by the driver 120 for simulating the behavior of the target vehicle on the EV 110. The other information 594 may include other application specific information.

Returning to FIG. 4, the input modules 410 may also include the safety module 416. The safety module 416 may provide information to perform safety checks during the simulating process to ensure the simulation is safe and conforming with certain rules and regulations. For example, the safety module 416 may include range information for the configuration parameters such that the range information can be used for a safety check on the configuration parameters to ensure the values of the configuration parameters are within safe ranges. The safety module 416 may also include range information for the output parameters and/or action parameters such that the range information can be used for a safety check on the output parameters and/or the action parameters to ensure the values of the output parameters and/or the action parameters are within safe ranges.

Further, the safety module 416 may also include regulatory information such that the regulatory information can be used for a safety check on output parameters and/or the action parameters to ensure the values of the output parameters and/or the action parameters are confirming with the regulations, with or without the location information. The safety module 416 may also include certain system patch or updating information such that the simulator 402 and other modules may be updated or patched using the system patch or updating information. The safety module 416 may also include host vehicle requirement, such as engine fault codes, overdue maintenance, and low tire pressure. The safety module 416 may also include miscellaneous requirements or other information, such as road topography, local regulation and/or rules, weather condition.

Further, as shown in FIG. 4, the plurality of output modules 420 may include a look and feel module 422, a target dynamics module 424, and a data module 426, etc. Other modules may also be included. The look and feel module 422 may receive output parameters of the simulator 402 that are static and/or related to the look and feel of the target vehicle, such as dashboard display, light display, and driver seat and steeling positioning and postures, etc. That is, all the data related to what the target vehicle would look and feel like, i.e., what the vehicle should sound like, what the vehicle should like, what the displays should be.

The target dynamics module 424 may receive output parameters of the simulator 402 that are dynamic and that require certain continuous actions to be performed on the EV 110 to change the driving characteristics of the EV 110. That is, all the data related to what run-time vehicle behavior, such as acceleration or deceleration, etc. When actions are needed to achieve the target behavior, the target dynamics module 424 may provide information to the replay module 432 to cause change of the vehicle behavior to meet the target profile of the driver 120.

Further, the data module 426 may record simulation data from the simulator 402 and store the data or upload the data to cloud server 140 for further training the simulation model in the simulator 402. For example, the data module 426 may also record trip data and may share the trip data, under the simulated scenarios, over the social media or other networks. That is, the driver 120 may share the drive data of a virtual vehicle (i.e., simulated target vehicle) on the social media using the data module 426. In some embodiments, a heat map may be introduced to analyze the trip data from the EV to identify/remove noises. After the noises are identified/removed from the trip data from the EV, the trip data can be clustered into one or more domains. Based on the one or more domains of the trip data from the EV, patterns and anomalies may be discovered. For example, vehicle simulating models may be created and trained corresponding to certain patterns and anomalies. Thus, additional revenues may be earned to offer pattern-specific and/or anomaly-specific simulation services to customers.

Further, as shown in FIG. 4, the plurality of action module 430 may include a replay module 432, a vehicle control, display, and sound module 434, a vehicle powertrain module 436, and a vehicle data analysis 438, etc. Other modules may also be included. The replay module 432 may be provided for performing actions required to achieve the target behavior of the target vehicle. That is, the replay module 432 may receive the information from the target dynamics module 424 to determine one or more actions required to achieve the target behavior, and may further direct respective modules to perform related actions.

For example, the vehicle control, display, and sound module 434 may perform actions that fall into the categories of control, display, and sound; the vehicle powertrain module 436 may perform actions related to the powertrain; and the vehicle data analysis 438 may collect all the action data and may further anonymize the collected data such that the anonymized driving data can be uploaded to the cloud server 140 for analysis and/or simulation model training. For example, the collected data may include usage statistics such as simulation duration, location, and activation frequency, and error logs such as instances when the simulator 402 fails to initialize or is deactivated by the safety module 416 during the operation.

Figure 6:
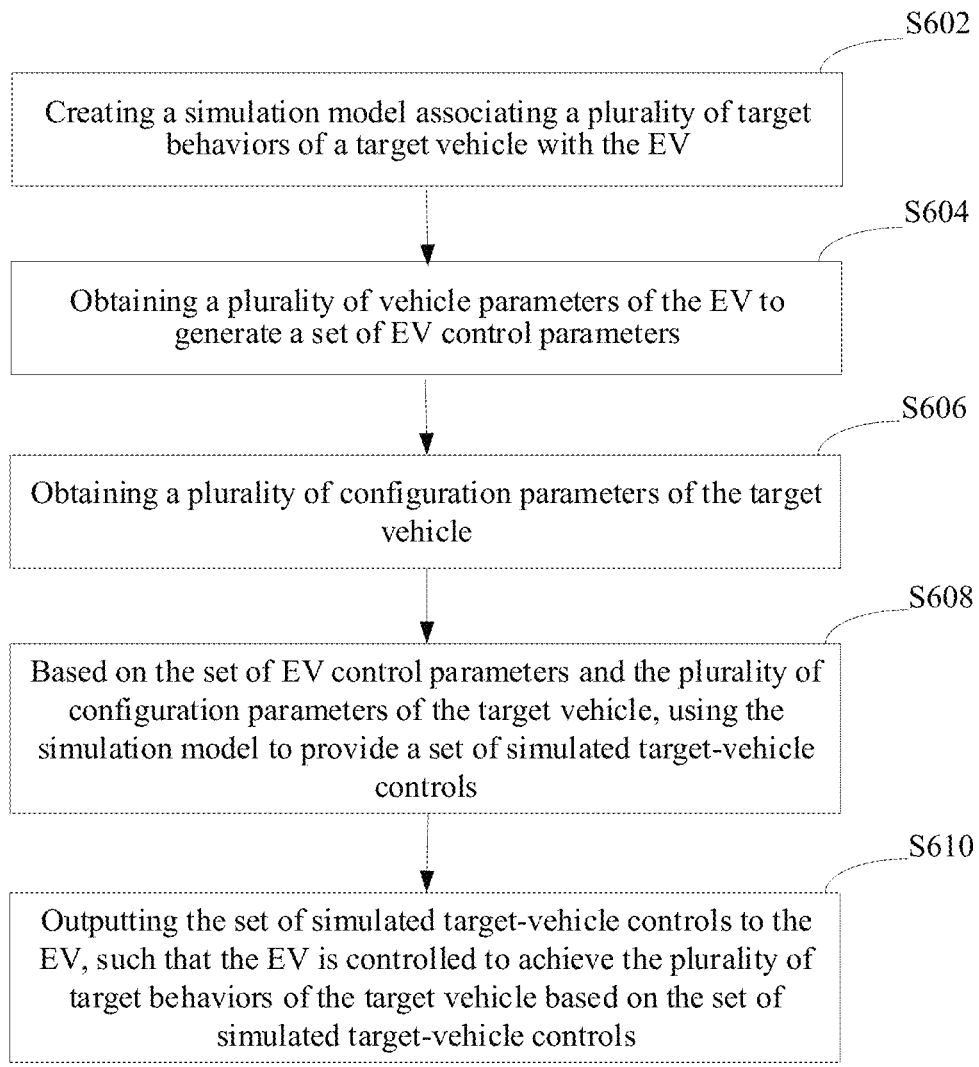
FIG. 6 illustrates a flowchart of an exemplary simulating method for an EV according to embodiments of the present disclosure.

In operation, the simulating system 400 or the onboard computer system 230 interact with the driver 120 to perform various simulating processes provided by the simulating system 400. FIG. 6 illustrates a flowchart of an exemplary simulating method for an EV according to embodiments of the present disclosure. The EV can be the EV 110 shown in FIG. 1 and FIG. 2. The processor 304 of the onboard computer system 230 may execute the program instructions stored in the memory 302 to implement the simulating method.

At S602, a simulation model associating a plurality of target behaviors of a target vehicle with the EV is created.

Recreating or replaying experience of driving the target vehicle for a driver driving the EV brings a nostalgia feeling to the driver. The EV can be operated in the regular mode or in the simulation mode. When the EV is operated in the regular mode, the EV exhibits behaviors of the EV. When the EV is operated in the simulation mode, the EV exhibits the plurality of target behaviors of the target vehicle. In other words, to replay the plurality of target behaviors of the target vehicle on the EV, the driver of the EV needs to operate the EV in the simulation mode.

When the EV is operated in the regular mode by the driver, the driver of the EV controls the EV through a plurality of input devices of the EV to generate a plurality of vehicle parameters of the EV. The onboard computer system of the EV obtains the plurality of vehicle parameters of the EV to generate the set of EV control parameters, and controls the EV based on the set of EV control parameters.

When the EV is operated in the simulation mode by the driver, the driver of the EV controls the EV through the plurality of input devices of the EV to generate the plurality of vehicle parameters of the EV. The onboard computer system of the EV obtains the plurality of vehicle parameters of the EV to generate the set of the EV control parameters. However, the onboard computer system does not control the EV directly based on the set of the EV control parameters. Instead, the onboard computer system uses the simulation model to translate the set of EV control parameters into a set of simulated target-vehicle controls, and controls the EV based on the set of simulated target-vehicle controls. A simulated target-vehicle control may be an output setting or other output parameter which controls operation of the EV. Examples of the simulated target-vehicle controls include one or more of the target turn angle, the target acceleration or deceleration, the target drive wheels, the target traction settings, the target handling characteristics, and the target engine sound.

Both the set of EV control parameters and the set of simulated target-vehicle controls are used to control the EV. The set of EV control parameters is used to control the EV when the EV is operated in the regular mode. The set of simulated target-vehicle controls is used to control the EV when the EV is operated in the simulation mode. When the EV is operated in the simulation mode, the EV exhibits the target behaviors of the target vehicle. The translation of the set of the EV control parameters into the set of simulated target-vehicle controls through the simulation model facilitates operating the EV in the simulation mode.

In some embodiments, an objective of translating the set of the EV control parameters into the set of simulated target-vehicle controls is to recreate the plurality of target behaviors of the target vehicle on the EV. However, due to differences between the EV and the target vehicle, an accurate translation of the set of the EV control parameters into the set of simulated target-vehicle controls is not determined by optimization of individual parameters but is determined by a combined effect of all parameters. In other words, the accurate translation is not only an objective engineering issue but also a subjective look and feel issue. Moreover, the accurate translation focuses on subjective look and feel perceived by the driver of the EV. In the present disclosure, perception of other passengers of the EV is irrelevant.

In some embodiments, because the accurate translation is about the look and feel perceived by the driver of the EV, it is difficult to obtain a mathematical function for the simulation model to reflect a relationship between the set of the EV control parameters and the set of simulated target-vehicle controls. A machine learning approach is explored to obtain the simulation model. In this case, the simulation model is created and trained on a high-performance computer system separated from the EV. After the simulation model is trained with training datasets to achieve certain performance objectives, the simulation model can be loaded into the onboard computer system of the EV. The simulation model is able to convert the set of the EV control parameters into the set of simulated target-vehicle controls in real-time, such that the driver of the EV feels like driving the target vehicle.

In some embodiments, the simulation model may be loaded into the cloud server, and the simulation process is also performed at the cloud server. In this case, the data needed for the simulation process may be exchanged between the EV and the cloud server. As such, the battery charge can be preserved for driving the EV.

In some embodiments, the simulation model is a neural network. The set of the EV control parameters is inputted into the neural network to obtain the set of simulated target-vehicle controls.

Referring to FIG. 6, at S604, a plurality of vehicle parameters of the EV is obtained to generate a set of EV control parameters. The plurality of vehicle parameters of the EV at least include run-time parameters of the EV and driving conditions of the EV.

To simulate the plurality of target behaviors of the target vehicle on the EV, the onboard computer system needs to obtain information about both the EV and the target vehicle. The plurality of vehicle parameters of the EV is real-time data collected by various sensors and input devices of the EV. Based on the plurality of vehicle parameters of the EV, the onboard computer system generates the set of EV control parameters. In the regular mode, the set of EV control parameters can be used to control the EV directly. In the simulation mode, the set of EV control parameters is inputted into the simulation model to obtain the set of simulated target-vehicle controls. The set of simulated target-vehicle controls is used to control the EV to simulate the plurality of target behaviors of the target vehicle.

For example, the plurality of vehicle parameters may include steering parameters, acceleration and deceleration parameters, and suspension parameters. The steering parameters may include a steering wheel position, a brake pedal position, a shock position, vehicle weight distribution, a torque vector, road surface condition, battery availability, or a combination thereof. The acceleration and deceleration parameters may include the steering position, the road surface condition, observed traction, available power, a motor temperature, a battery pack temperature, a gyro reading, an accelerator reading, a suspension position, a throttle position, the brake pedal position, regen settings, or a combination thereof. Some parameters may appear in more than one of the steering parameters, the acceleration and deceleration parameters, and the suspension parameters. The onboard computer system 230 may obtain the plurality of vehicle parameters of the EV 110 from the various subsystems or components of the EV 110 in real-time.

Referring back to FIG. 6, at S606, a plurality of configuration parameters of the target vehicle is obtained. A configuration parameter of the target vehicle may be a setting or other parameter that affects how the vehicle operates. In an embodiment, the plurality of configuration parameters at least includes information of the target vehicle and settings of the target vehicle for the driver. For example, after the onboard computer system 230 receives the simulation request from the driver 120, the onboard computer system 230 may enter into a simulation mode to start various simulating processes. The onboard computer system 230 may then obtain the configuration parameters for the simulating processes. Specifically, the onboard computer system 230 may obtain driver related information, and target behavior and target vehicle information. Additionally, or optionally, safety information associated with the simulating processes may also be obtained by the onboard computer system 230 locally or remotely from the cloud server 140. For example, the safety information may include health information of the EV, local traffic/safety rules and regulations, and surrounding information from a driver assistance system.

The driver profile may be obtained for the driver related information, and a target profile may also be obtained for the target behavior and target vehicle information. The target profile may indicate the target behavior to be simulated and/or the target vehicle to be simulated. The target profile may include various types of information such as horsepower/torque curves, weight distribution, suspension rates/type/programming, a steering ratio, a wheelbase, a vehicle type, fuel consumption curves, dashboard data, control weights for steering, acceleration pedal feel, and brake pedal feel, braking figures, or a combination thereof. The target behavior is not initially configured on the EV 110.

In certain embodiments, the target profile may be included in the driver profile. Thus, the onboard computer system 230 may obtain the target vehicle from the driver profile of the driver 120. In certain situations, obtaining the target profile of the target vehicle may include using an interior camera to obtain an identity of a driver of the EV, and retrieving the driver profile and/or the target profile associated with the identity of the driver of the EV. In some embodiments, the driver 120 may also input the target vehicle into the onboard computer system 230 through an input interface of the onboard computer system 230.

Optionally or additionally, after obtaining the configuration parameters, and based on the safety information, the onboard computer system 230 may determine whether it is safe to activate the simulation before activating the simulation. For example, the onboard computer system 230 may evaluate the health of the EV based on presence of engine fault codes, overdue maintenance, and low tire pressure. After the activating the simulation, the onboard computer system 230 may perform a safety check to determine whether it is safe to continue the simulation. Specifically, the onboard computer system 230 may perform a first safety check on the configuration parameters to determine whether the configuration parameters are within a safety range of the EV 110. If certain configuration parameters are out of the safety range, the onboard computer system 230 may prompt an error message and may exit the simulation mode. If the first safety check passes, the onboard computer system 230 may enter the simulation mode to continue the simulating processes.

In some embodiments, before the EV starts to operate in the simulation mode, the onboard computer system 230 may obtain a request from a driver of an EV to simulate a target behavior of a target vehicle on the EV. For example, the driver 120 may interact with the onboard computer system 230 to input a simulation request to the onboard computer system 230, and may also provide a driver profile to the onboard computer system 230. The interaction between the driver 120 and the onboard computer system 230 may be in various ways. In one embodiment, the driver 120 may enter the request and/or the driver profile manually through a human-machine interface (HMI) of the onboard computer system 230. In some other embodiments, the driver 120 may enter the request and/or the driver profile through other devices.

For example, the driver 120 may carry a user terminal 130. The driver 120 may request the simulation, and manage the onboard computer system 230 and the simulation through the user terminal 130. The driver 120 may configure a driver profile on the user terminal 130 and load the driver profile onto the onboard computer system 230. The driver profile may include information about the target vehicle in a target profile list, among other driver specific information items. The driver 120 may also manage a connection between the EV 110 and the cloud server 140. For example, the driver 120 may use a mobile application on the user terminal 130 to configure the onboard computer system 230 of the EV 110 to establish the connection to the cloud server 140.

In some embodiments, after the driver 120 enters the EV 110, the onboard computer system 230 may recognize the driver 120 through a camera of the EV 110 and may make a simulation request through the camera. In some other embodiments, the onboard computer system 230 may recognize the driver 120 through the user terminal 130 that is wirelessly connected to the onboard computer system 230. For example, the wireless connection is a Bluetooth connection. After recognizing the driver 120, the onboard computer system 230 retrieves the driver profile associated with the driver 120. The onboard computer system 230 may retrieve the driver profile from a memory device of the onboard computer system 230, from the wirelessly connected user terminal 130 of the driver 120, or from the cloud server 140.

Referring back to FIG. 6, at S608, the simulation model is used to provide a set of simulated target-vehicle controls based on the set of EV control parameters and the plurality of configuration parameters of the target vehicle. More specifically, the set of EV control parameters and the plurality of configuration parameters of the target vehicle may be provided to the simulator 402 as input parameters such that the simulator 402 may generate the set of simulated target-vehicle controls that reflect the target behavior of the target vehicle. In some embodiments, to save the battery charge of the EV 110, the onboard computer system 230 may offload the performing of the target vehicle simulating process to the cloud server 140. After completing the target vehicle simulating process, the cloud server 140 returns the plurality of output parameters back to the onboard computer system 230. In this case, the data exchange occurred between the onboard computer system 230 and the cloud server 140 through wireless communication may cause a slight delay.

In some embodiments, to accurately reflect the relationship between the set of EV control parameters and the set of simulated target-vehicle controls, the simulation model needs to be trained with training datasets and needs to be tested with testing datasets. The training datasets and the testing datasets often include sample sets of EV control parameters and corresponding sets of simulated target-vehicle controls. However, the training datasets and testing datasets are not readily available.

In a process of designing the EV or the target vehicle, designers often create an engineering model of the EV or the target vehicle. For example, the engineering model of the EV can be used to generate a plurality of sets of EV control parameters, and the engineering model of the target vehicle can be used to generate a plurality of sets of target-vehicle controls. In another example, a manufacturer of the EV may be able to collect the plurality of sets of EV control parameters and another manufacturer of the target vehicle may be able to collect the plurality of sets of target-vehicle controls. In another example, the driver of the EV may be able to collect the plurality of sets of EV control parameters for the EV driven by the driver and the driver of the target vehicle may be able to collect the plurality of sets of target-vehicle controls for the target vehicle driven by the driver.

In some embodiments, the target vehicle is a vehicle different from the EV, the EV is configured with adjustable seats, and the behavior of the target vehicle includes at least a seat profile, such that bolstering lumbar support, and seat depth of the adjustable seats of the EV are adjusted to simulate that of the target vehicle's seats.

In some embodiments, the adjustable seats of the EV are controlled to gradually return to original settings by the driver of the EV after a pre-configured time expires.

In some embodiments, the target vehicle is an ICE vehicle, the EV is configured with massage actuators in the driver seat, and the behavior of the target vehicle includes controlling the massage actuators in the driver seat to vibrate to simulate the vibration of the ICE engine.

In some embodiments, the target vehicle is a vehicle different from the EV, the EV is equipped with an olfactory scent dispenser, and the behavior of the target vehicle includes at a scent profile, such that the olfactory scent dispenser is controlled to discharge fragrance to simulate a scent found in the target vehicle, the scent being a scent of genuine leather or vegan leather.

Figure 7:
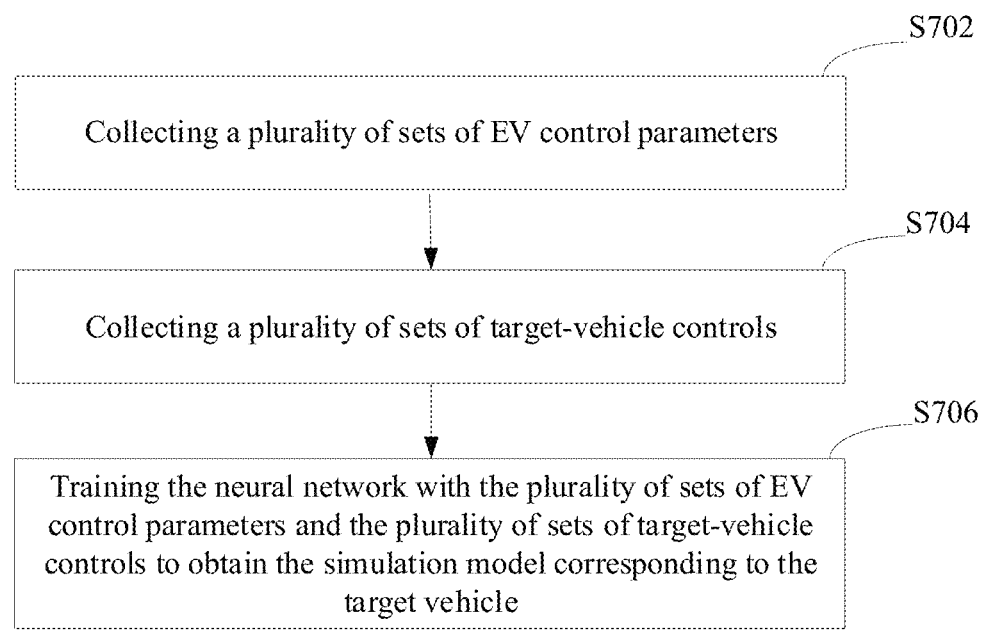
FIG. 7 illustrates a flowchart of an exemplary method of training the simulation model according to embodiments of the present disclosure.

FIG. 7 illustrates a flowchart of an exemplary method of training the simulation model according to embodiments of the present disclosure. As shown in FIG. 7, at S702, a plurality of sets of EV control parameters is collected, and at S704, a plurality of sets of target-vehicle controls is collected. Regardless of the methods of collecting the plurality of sets of EV control parameters and the plurality of sets of target-vehicle controls, the plurality of sets of EV control parameters and the plurality of sets of target-vehicle controls can be used as the training datasets and the testing datasets to train and test the simulation model respectively. As shown in FIG. 7, at S706, the neural network is trained with the plurality of sets of EV control parameters and the plurality of sets of target-vehicle controls to obtain the simulation model corresponding to the target vehicle.

Because the training datasets do not include the plurality of sets of simulated target-vehicle controls, the neural network of the simulation model needs to have a structure that can take advantage of the training datasets readily available. In some embodiments, the neural network is a cycle generative adversarial network (CycleGAN). The cycleGAN includes a first GAN and a second GAN. The first GAN includes a first generator model and a first discriminator. The second GAN includes a second generator model and a second discriminator.

The CycleGAN technique is originally developed for unpaired image-to-image translation. In the present disclosure, the plurality of sets of EV control parameters and the plurality of sets of simulated target-vehicle controls are not image data. However, just like the image data translated by the CycleGAN, the plurality of sets of EV control parameters and the plurality of sets of simulated target-vehicle controls are not paired. The CycleGAN can be trained using unpaired training datasets from two different domains (e.g., the EV domain and the target vehicle domain). In the embodiments of the present disclosure, the unpaired training datasets are the plurality of sets of EV control parameters and the plurality of sets of target-vehicle controls. Thus, the simulation model having the CycleGAN structure can be trained to accurately translate the set of EV control parameters into the corresponding set of simulated target-vehicle controls that provides the driver of the EV with authentic look and feel of the plurality of the target behaviors of the target vehicle.

Figure 8:
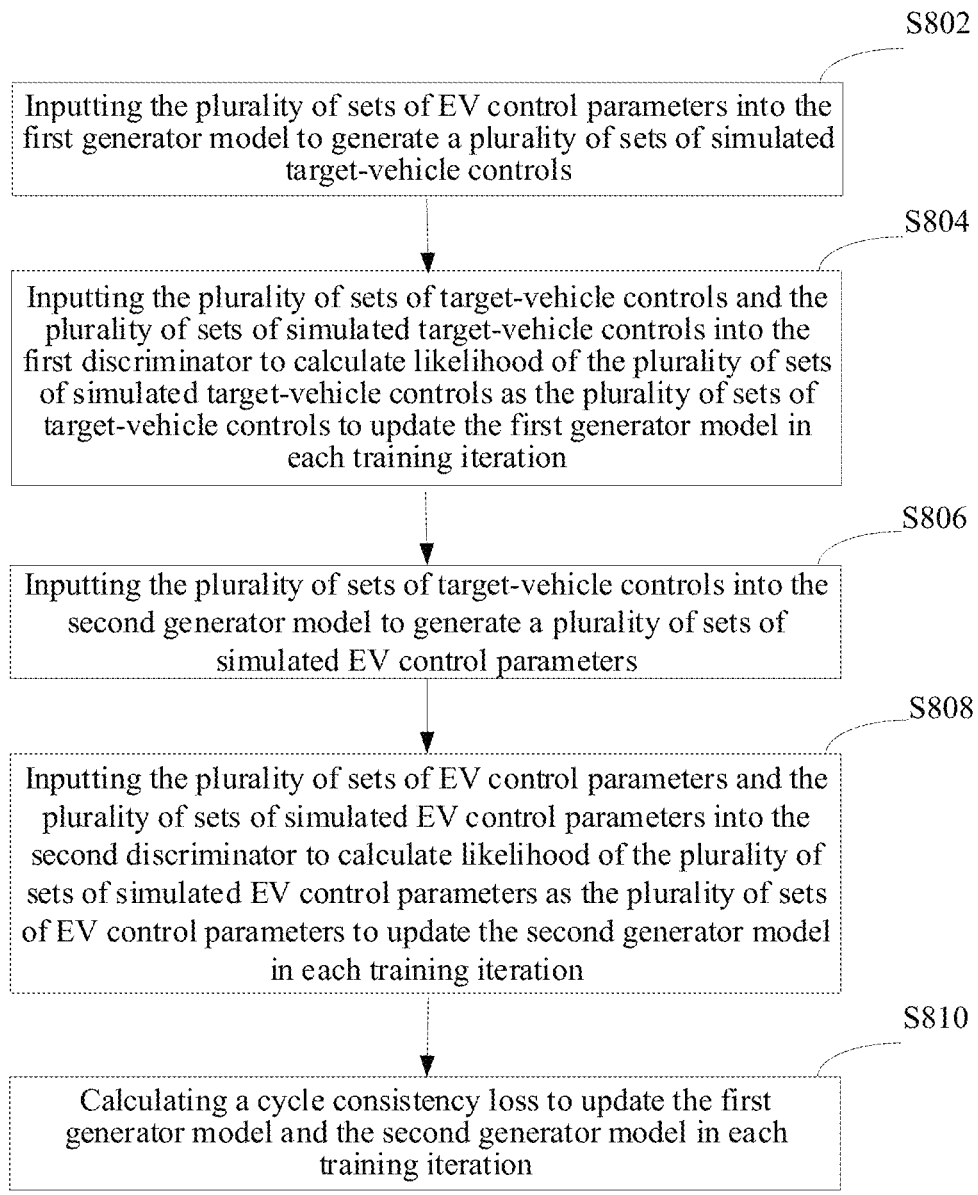
FIG. 8 illustrates a flowchart of another exemplary method of training the simulation model according to embodiments of the present disclosure.

The following describes how to use the training datasets to train the CycleGAN. FIG. 8 illustrates a flowchart of another exemplary method of training the simulation model according to embodiments of the present disclosure. As shown in FIG. 8, the method of training the simulation model includes the following processes.

At S802, the plurality of sets of EV control parameters is inputted into the first generator model to generate a plurality of sets of simulated target-vehicle controls.

In this case, a set of the EV control parameters are run-time EV control parameters as a result of the driver's operation of the EV, and a set of simulated target-vehicle controls are run time EV control parameters for simulating the target vehicle. The objective of the simulation model is to translate the set of the EV control parameters to the corresponding set of simulated target-vehicle controls. If a plurality of sets of EV control parameters and a plurality of sets of simulated target-vehicle controls corresponding to the plurality of sets of EV control parameters are readily available, the first generator model alone can be trained to accurately translate from a set of EV control parameters to a corresponding set of simulated target-vehicle controls. However, such paired training datasets are not readily available. Instead, only the plurality of EV control parameters and the plurality of sets of target-vehicle controls can be collected as the training datasets. Here, a set of target-vehicle controls are run time target-vehicle control parameters as a result of the driver's operation of the target vehicle.

CycleGAN technique is utilized to overcome the issue of lack of paired training datasets.

At S804, the plurality of sets of target-vehicle controls and the plurality of sets of simulated target-vehicle controls are inputted into the first discriminator to calculate a likelihood of the plurality of sets of simulated target-vehicle controls as the plurality of sets of target-vehicle controls to update the first generator model in each training iteration.

The first discriminator is used to make the plurality of sets of simulated target-vehicle controls (EV control parameters) generated by the first generator model look like the plurality of sets of target-vehicle controls (target-vehicle control parameters). However, because the training datasets, i.e., the plurality of sets of EV control parameters the plurality of sets of target-vehicle controls, are not paired, even if the plurality of sets of simulated target-vehicle controls (EV control parameters) look like the plurality of sets of target-vehicle controls, the plurality of sets of simulated target-vehicle controls are not accurate translation of the plurality of EV control parameters. For example, a set of simulated target-vehicle controls may simulate the gear-shifting of the target vehicle in general, but may not accurately reflect the gear-shifting of the target vehicle specific to the acceleration pedal position. The acceleration pedal position is indirectly captured in the set of EV control parameters. This issue will be addressed by a cycle consistency loss function described below.

At S806, the plurality of sets of target-vehicle controls is inputted into the second generator model to generate a plurality of sets of simulated EV control parameters.

To form the CycleGAN structure, the second GAN performs a translation that is reverse of the first GAN. In this case, the set of target-vehicle controls are run-time target-vehicle control parameters as a result of the driver's operation of the target vehicle, and a set of simulated EV control parameters are run time target-vehicle control parameters for simulating the EV. Because the simulation model is only intended to simulate the target vehicle on the EV, the set of simulated EV control parameters have no practical use, but are necessarily for CycleGAN training purpose.

At S808, the plurality of sets of EV control parameters and the plurality of sets of simulated EV control parameters are inputted into the second discriminator to calculate a likelihood of the plurality of sets of simulated EV control parameters as the plurality of sets of EV control parameters to update the second generator model in each training iteration.

Similarly, the second discriminator improves performance of the second generator model.

Figure 9A:
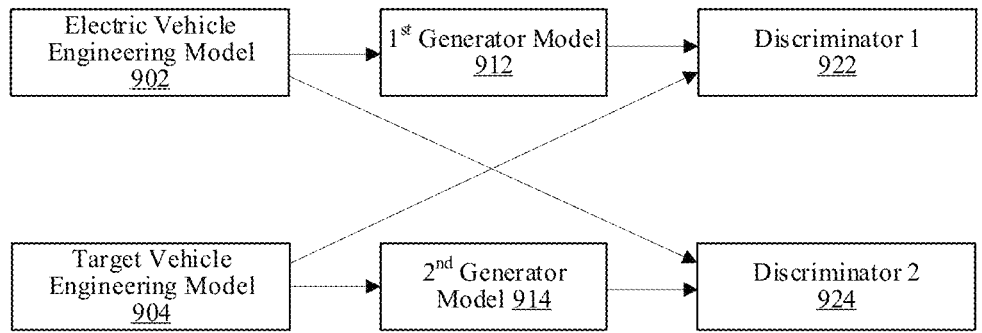
FIG. 9A illustrates training an exemplary simulator model according to embodiments of the present disclosure.

FIG. 9A illustrates training an exemplary simulator model according to embodiments of the present disclosure. In some embodiments, as shown in FIG. 9A, training the neural network includes inputting the plurality of sets of EV control parameters generated by the EV engineering model 902 into the first generator model 912 to generate a plurality of sets of simulated target-vehicle controls, inputting the plurality of sets of target-vehicle controls and the plurality of sets of simulated target-vehicle controls into the first discriminator 922 to calculate likelihood of the plurality of sets of simulated target-vehicle controls as the plurality of sets of target-vehicle controls to update the first generator model 912 in each training iteration, inputting the plurality of sets of target-vehicle controls generated by the target vehicle engineering model 904 into the second generator model 914 to generate a plurality of sets of simulated EV control parameters; inputting the plurality of sets of EV control parameters and the plurality of sets of simulated EV control parameters into the second discriminator 924 to calculate likelihood of the plurality of sets of simulated EV control parameters as the plurality of sets of EV control parameters to update the second generator model 914 in each training iteration, and calculating a cycle consistency loss to update the first generator model 912 and the second generator model 914 in each training iteration.

The training of the simulation model includes two aspects. One aspect is to maximize the likelihood through either discriminator. Another aspect is to minimize the cycle consistency loss. As shown in FIG. 8, at S810, a cycle consistency loss is calculated to update the first generator model and the second generator model in each training iteration.

There are two ways in which the cycle consistency loss is calculated and used to update the first generator model and the second generator model in each training iteration. The cycle consistency loss can be calculated as a forward cycle consistency loss or a backward cycle consistency loss, and both are described in the following.

Figure 9B:
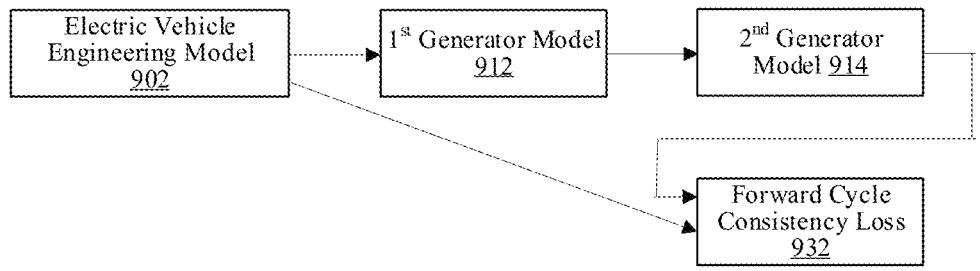
FIG. 9B illustrates calculating a forward cycle consistency loss according to embodiments of the present disclosure.

FIG. 9B illustrates calculating a forward cycle consistency loss according to embodiments of the present disclosure. In some embodiments, as shown in FIG. 9B, calculating the cycle consistency loss includes inputting the plurality of sets of EV control parameters generated by the EV engineering model 902 into the first generator model 912 to generate the plurality of sets of simulated target-vehicle controls, inputting the plurality of sets of simulated target-vehicle controls generated by the first generator model 912 into the second generator model 914 to generate the plurality of sets of simulated EV control parameters, and comparing the plurality of sets of EV control parameters and the plurality of sets of simulated EV control parameters generated by the second generator model 914.

Figure 9C:
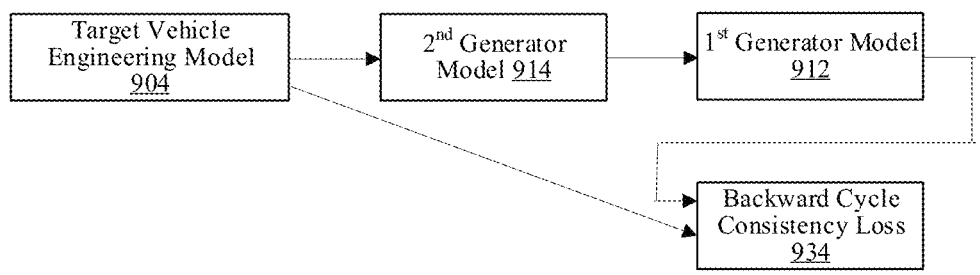
FIG. 9C illustrates calculating a backward cycle consistency loss according to embodiments of the present disclosure.

FIG. 9C illustrates calculating a backward cycle consistency loss according to embodiments of the present disclosure. In some embodiments, as shown in FIG. 9C, calculating the cycle consistency loss includes inputting the plurality of sets of target-vehicle controls generated by the target vehicle engineering model 904 into the second generator model 914 to generate the plurality of sets of simulated EV control parameters, inputting the plurality of sets of simulated EV control parameters generated by the second generator model 914 into the first generator model 912 to generate the plurality of sets of simulated target-vehicle controls, and comparing the plurality of sets of target-vehicle controls and the plurality of sets of simulated target-vehicle controls generated by the first generator model 912.

Referring to FIG. 6, at S610, the set of simulated target-vehicle controls is outputted to the EV, such that the EV is controlled to achieve the plurality of target behaviors of the target vehicle based on the set of simulated target-vehicle controls.

In some embodiments, the simulation model is trained with the datasets that are readily available. The simulation model accurately translates the set of EV control parameters into the set of simulated target-vehicle controls. The set of the simulated target-vehicle controls is used to control the EV to provide the driver of the EV with the authentic look and feel of the plurality of target behaviors of the target vehicle.

In some embodiments, a safety check is performed on the set of simulated target-vehicle controls before outputting the set of simulated target-vehicle controls to the EV. The safety check ensures that the EV operates safely if the set of simulated target-vehicle controls is used to control the EV.

In some embodiments, creating the simulation model includes obtaining the simulation model from a cloud server that contains a plurality of simulation models trained in advance for a plurality of target vehicles, respectively. The plurality of simulation models may be trained for the plurality of target vehicles, respectively. Different target vehicles correspond to different simulation models. The EV obtains the simulation model corresponding to the target vehicle selected by the driver of the EV.

In some embodiments, the plurality of target behaviors of the target vehicle includes vehicle handling characteristics, gear shifting, dynamic engine sound and vibration to a driver seat, a simulated dashboard of the target vehicle, or a combination thereof. The plurality of target behaviors of the target vehicle is not initially configured on the EV.

In some embodiments, the plurality of vehicle parameters of the EV includes a steering wheel position, vehicle weight distribution, a road surface condition, shock distribution, a brake position, a torque vector, battery availability, an acceleration pedal position, a steering wheel position, observed traction, available power, a motor temperature, a battery temperature, a gyro measurement, an accelerator measurement, a suspension position, a throttle position, a brake position, regeneration settings, a window position, or a combination thereof.

In some embodiments, each set of simulated target-vehicle controls includes a target turn angle, a target steering ratio, target weight distribution, a target wheelbase, target acceleration or deceleration, target drive wheels, target traction settings, target handling characteristics, a target engine sound at least at a driver side of the EV, or a combination thereof.

In some embodiments, the target vehicle includes an internal combustion engine (ICE) vehicle or another electric vehicle.

In some embodiments, the onboard computer system 230 may obtain the output parameters (i.e., the set of simulated target-vehicle controls) from the simulator 402 for realizing the target behavior of the target vehicle. After obtaining the output parameters, and based on the safety information, the onboard computer system 230 may perform a second safety check on the parameters to determine whether certain parameters are within the safety range of the EV 110. If any parameter is out of the safety range, the onboard computer system 230 may generate an error message and may stop using the out-of-range parameter in any further processes or actions.

In some embodiments, the output parameters from the simulator 402 may be fed into another machine learning process to determine safety risks. The another machine learning process may include a reinforcement learning algorithm. The reinforcement learning algorithm not only identifies immediate safety risks and avoids operating the EV in presence of the immediate safety risks, but also identifies future safety risks and avoids operating the EV in presence of the future safety risks.

In some embodiments, the reinforcement learning algorithm is used to dynamically adjust the safety range for the second safety check to minimize the safety risks.

Further, the onboard computer system 230 may perform one or more actions to achieve the target behavior of the target based the output parameters. For example, the onboard computer system 230 may generate control parameters for related subsystems or components of the EV 110 to control the subsystems/components to achieve the simulated target behavior of the target vehicle. For example, the one or more control parameters may include the steering controls, the powertrain controls, the suspension controls, the dashboard display, the engine sound, the haptic controls, the driver seat controls, or a combination thereof. The simulated behavior of the target vehicle may include the vehicle handling characteristics, the gear shifting, the dynamic engine sound and vibration to a driver seat, the simulated dashboard of the target vehicle, and a combination thereof.

Certain actions may be performed statically by the onboard computer system 230, such as display and sound related actions, while certain other actions may be performed dynamically during the operation of the EV 110, such as powertrain and driving related actions. For example, the onboard computer system 230 may render a different dashboard display as the target dashboard of the target vehicle target on the EV. In some embodiments, the onboard computer system 230 may perform an automatic dashboard adjustment as the target dashboard of the target vehicle target on the EV 110. For example, the onboard computer system 230 may divide an electric dashboard of the EV 110 into multiple zones, measure brightness of ambient light in each zone by one or more photo sensors, and adjust contrast, brightness, and content of each zone based on the brightness of ambient light in each zone.

In one embodiment, based on the output parameters, the onboard computer system 230 may adjust certain subsystems to simulate the target turn angle, the target steering ratio, the target weight distribution, and the target wheelbase. In another embodiment, based on the output parameters, the onboard computer system 230 may adjust certain subsystems to simulate the target acceleration or deceleration, the target drive wheels, the target traction settings, and the target handling characteristics. In another embodiment, based on the output parameters, the onboard computer system 230 may adjust the onboard speaker subsystem to simulate the target engine sound. In another embodiment, based on the output parameters, the onboard computer system 230 may perform a driver seat transformation including tightening bolters, changing firmness, changing lumbar, or a combination thereof within a pre-configured time, and resuming driver seat settings after the pre-configured time expires.

Further, the onboard computer system 230 may perform one or more data operations based on simulated target vehicle on the EV. That is, based on the virtual vehicle, i.e., the simulated target vehicle, certain vehicle related data may be processed and/or analyzed in various ways. For example, the onboard computer system 230 may obtain a location of the EV 110, and may perform further actions based on the location, such as determining local driving regulations corresponding to the location, and applying limitation of the local driving regulations on the control parameters to the EV 110. In one embodiment, the onboard computer system 230 may collect data of the simulating processes, as well vehicle data of the simulated target vehicle, and anonymize and upload the collected data to the cloud server 140 for training the vehicle simulator model. In another embodiment, the onboard computer system 230 may collect simulated trip data of the driver 120 and upload the trip data to a social media site identified by the driver 120. Other data operations may also be performed.

Accordingly, embodiments of the present disclosure provide a simulating method and system of an EV that simulates the behavior of a target vehicle on the EV. While driving the EV, the driver can request the simulation of the behavior of the target vehicle and enjoy the look and feel of the target vehicle and the fun of driving the target vehicle. The onboard simulating system also allows the driver to share the trip data collected when the EV is operated in the simulation mode to the social media. When the EV operates in the simulation mode, vehicle data generated by the onboard simulating system can also be collected and uploaded to a server as training data for training a new simulator model or retraining and updating the current simulator model.

The present disclosure also provides a method for mining trip data to obtain training datasets. When the EV is operated in the simulation mode, various parameters of the EV may be collected in real time. After the EV completes a trip, the trip data will be uploaded to the cloud server if the driver consents the collection of the trip data. The trip data may be mined to discover data domains. The data domains can be used to sort the trip data into data clusters. The data clusters may be used as the training datasets to train the simulation model.

Figure 10:
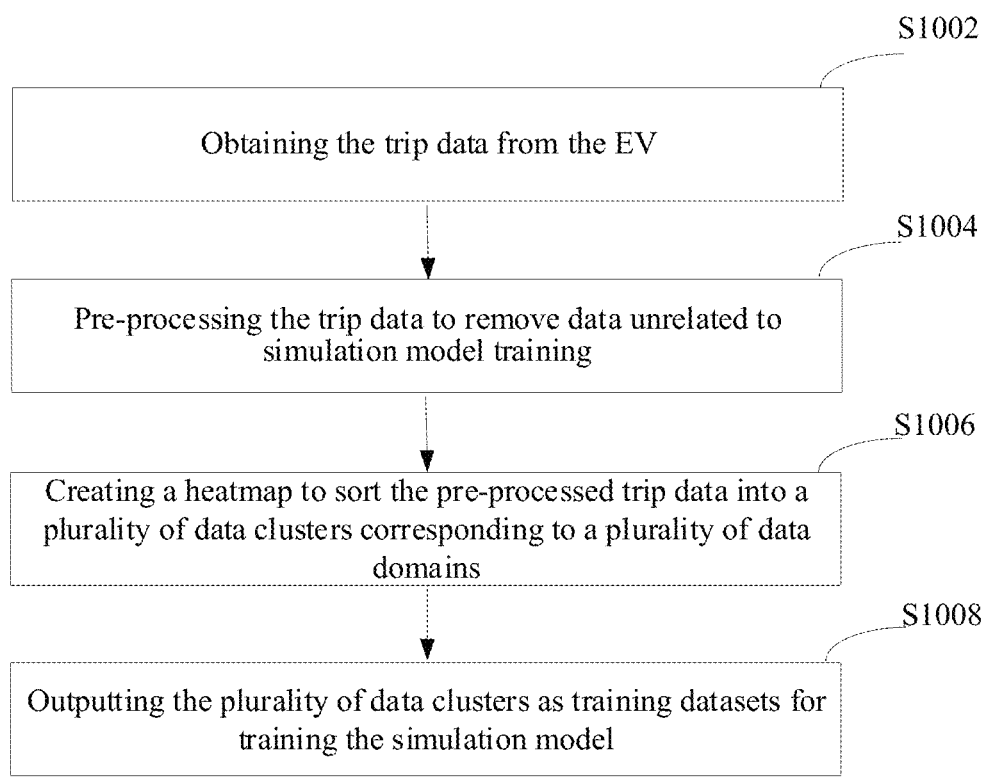
FIG. 10 illustrates a flowchart of an exemplary method for mining the trip data for the training datasets according to embodiments of the present disclosure.

FIG. 10 illustrates a flowchart of an exemplary method for mining the trip data for the training datasets according to embodiments of the present disclosure. As shown in FIG. 10, the method for mining the trip data includes the following steps.

At S1002, the trip data is obtained from the EV.

The trip data are collected in real time when the EV is operated in the simulation mode. The trip data can be stored in the onboard computer system of the EV. The trip data may be uploaded to the cloud server after the EV completes the trip. The trip data may be directly retrieved from the storage of the onboard computer system of the EV.

At S1004, the trip data is pre-processed to identify data unrelated to the simulation model training.

Because the trip data are collected for training the simulation model, the data unrelated to the simulation model training may be identified.

At S1006, a heatmap is created to sort the pre-processed data into a plurality of data clusters corresponding to a plurality of data domains.

Figure 11:
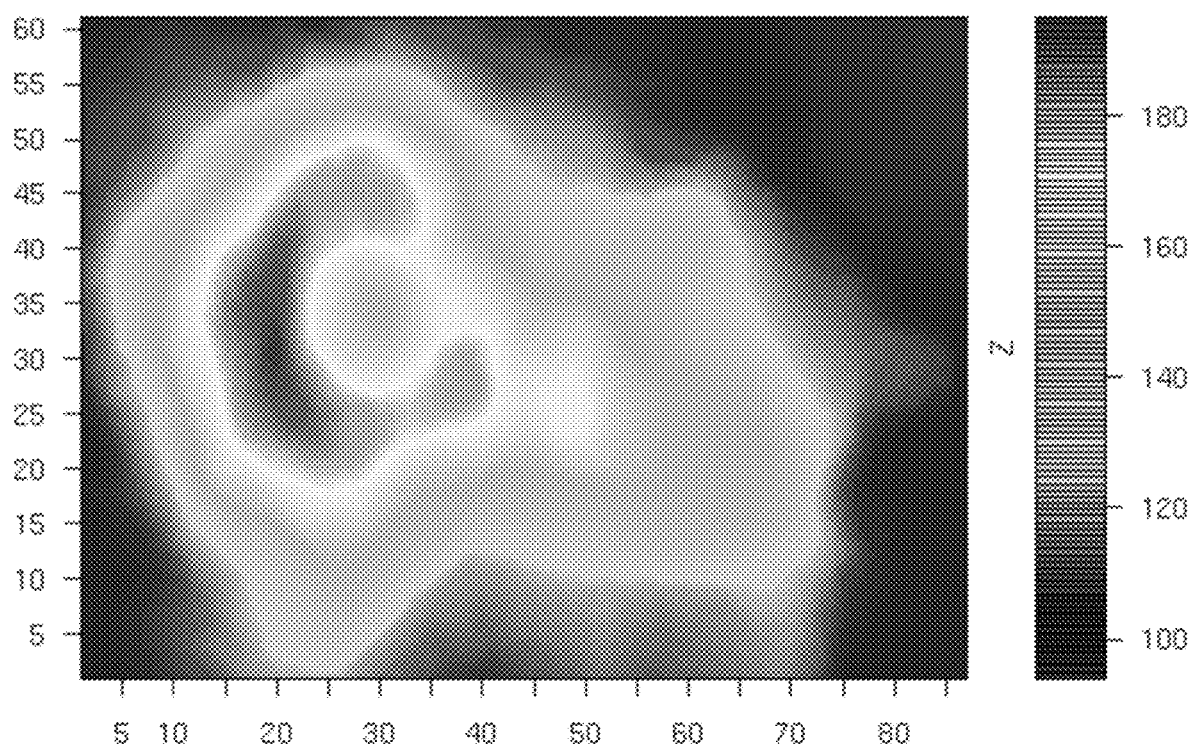
FIG. 11 illustrates an exemplary heatmap according to embodiments of the present disclosure.

For example, the heatmap shown in FIG. 11 helps reduce noises from the large amount of the trip data for each of the plurality of data domains. The plurality of data domains can be used to sort the trip data into the plurality of data clusters. The heat map helps in categorizing and/or generalizing the trip data such that the trip data can be further purged to identify noises in the trip data. The purged trip data can then be used as training dataset to improve the performance of the simulation model.

At S1008, the plurality of data clusters are outputted as training datasets for training the simulation model.

Figure 12:
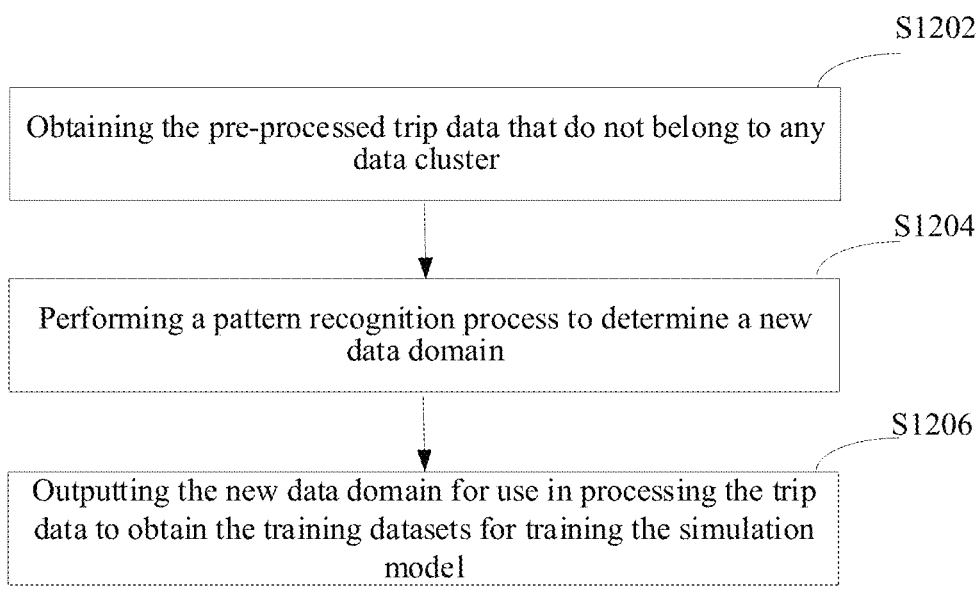
FIG. 12 illustrates a flowchart of discovering new data domains according to embodiments of the present disclosure.

FIG. 12 illustrates a flowchart of discovering new data domains according to embodiments of the present disclosure. The data that cannot be sorted into the plurality of data clusters can be processed to discover a new data domain.

At S1202, the pre-processed trip data that do not belong to any data cluster are obtained. For example, the pre-processed trip data that do not belong to any existing data cluster may be used to form a new data cluster identifying a new correlation. The new data cluster may be used to extract valuable insights.

At S1204, a pattern recognition process is performed to determine a new data domain.

The pattern recognition process may include a random forest algorithm to obtain more valuable insights from the pre-processed trip data that do not belong to any data cluster. The pattern recognition process can be used to extract the training datasets to train the simulation model for specific/extreme scenario.

At S1206, the new data domain is outputted for use in processing the trip data to obtain the training datasets for training the simulation model.

For example, the trip data based on weather and road topography could be noise for a specific data domain such as frequent braking by the driver in congested geographies such as India or China. However, for another data domain such as acceleration/torque during rain/snow, the frequent braking data may be used to improve the simulation model. In some embodiments, the frequent braking data may be used to determine the safety range for the second safety check.

In the embodiments of the present disclosure, the trip data can be collected with the driver's consent to train the simulation model to improve simulation performance. The trip data can also be used to determine the safety range for the safety check.

The foregoing embodiments describe in detail the objective, the technical solution, and the beneficial effect of the present disclosure. The foregoing disclosed embodiments are only some of the embodiments of the present disclosure rather than all of the embodiments of the present disclosure, which should not be used to limit the scope of present disclosure. Other embodiments obtained by those having ordinary skills in the art on the basis of the described embodiments without inventive efforts should fall within the scope of the present disclosure. Further, under circumstances of no conflict, embodiments and features in the embodiments may be combined with each other. Therefore, any changes, equivalent replacements, and modifications made according to the present disclosure still fall within the scope of the present disclosure.

What is claimed is:

1. A simulating method for an electric vehicle (EV), comprising:
    creating a simulation model associating a plurality of target behaviors of a target vehicle with the EV, wherein the simulation model is a neural network trained to reflect a relationship between EV control parameters and simulated target-vehicle controls, and is created by (a) collecting a plurality of sets of EV control parameters, (b) collecting a plurality of sets of simulated target-vehicle controls, (c) processing the plurality of sets of EV control parameters and the plurality of sets of target vehicle controls using heat maps to identify noises through data clustering, and (d) after processing the plurality of sets of EV control parameters and the plurality of sets of target vehicle controls, training the neural network with the plurality of sets of EV control parameters and the plurality of sets of target-vehicle controls to obtain the simulation model corresponding to the target vehicle;
    obtaining a plurality of vehicle parameters of the EV to generate an additional set of EV control parameters, the plurality of vehicle parameters of the EV at least including run-time parameters of the EV and driving conditions of the EV;
    obtaining a plurality of configuration parameters of the target vehicle, at least including information of the target vehicle and settings of the target vehicle for a driver;
    based on the additional set of EV control parameters and the plurality of configuration parameters of the target vehicle, using the simulation model to provide a set of simulated target-vehicle controls; and
    outputting the set of simulated target-vehicle controls to the EV, such that the EV is controlled to achieve the plurality of target behaviors of the target vehicle based on the set of simulated target-vehicle controls.

2. The method according to claim 1, further comprising:
    performing a safety check on the set of simulated target-vehicle controls before outputting the set of simulated target-vehicle controls to the EV.

3. The method according to claim 1, wherein creating the simulation model comprises:
    obtaining the simulation model from a cloud server that contains a plurality of simulation models trained, via a neural network, in advance for a plurality of target vehicles, respectively.

4. An electric vehicle (EV), comprising:
    a wireless communication device for connecting to a cloud server and/or a mobile device carried by a driver of the EV; and
    an onboard computer system for performing:
        creating a simulation model associating a plurality of target behaviors of a target vehicle with the EV, wherein the simulation model is a neural network trained to reflect a relationship between EV control parameters and simulated target-vehicle controls, and is created by (a) collecting a plurality of sets of EV control parameters, (b) collecting a plurality of sets of simulated target-vehicle controls, (c) processing the plurality of sets of EV control parameters and the plurality of sets of target vehicle controls using heat maps to identify noises through data clustering, and (d) after processing the plurality of sets of EV control parameters and the plurality of sets of target vehicle controls, training the neural network with the plurality of sets of EV control parameters and the plurality of sets of target-vehicle controls to obtain the simulation model corresponding to the target vehicle;
        obtaining a plurality of vehicle parameters of the EV to generate an additional set of EV control parameters, the plurality of vehicle parameters of the EV at least including run-time parameters of the EV and driving conditions of the EV;
        obtaining a plurality of configuration parameters of the target vehicle, at least including information of the target vehicle and settings of the target vehicle for a driver;
        based on the additional set of EV control parameters and the plurality of configuration parameters of the target vehicle, using the simulation model to provide a set of simulated target-vehicle controls; and
        outputting the set of simulated target-vehicle controls to the EV, such that the EV is controlled to achieve the plurality of target behaviors of the target vehicle based on the set of simulated target-vehicle controls.

5. The EV according to claim 4, wherein:
    the plurality of vehicle parameters of the EV includes a steering wheel position, vehicle weight distribution, a road surface condition, shock distribution, a brake position, a torque vector, battery availability, an acceleration pedal position, a steering wheel position, observed traction, available power, a motor temperature, a battery temperature, a gyro measurement, an accelerator measurement, a suspension position, a throttle position, a brake position, regeneration settings, a window position, or a combination thereof.

6. The method according to claim 1, wherein collecting the plurality of sets of EV control parameters includes:
    collecting the plurality of sets of EV control parameters generated by inputting the plurality of vehicle parameters of the EV into an EV simulator simulating behaviors of the EV;
    collecting the plurality of sets of EV control parameters generated by a plurality of anonymized EVs; and/or
    collecting the plurality of sets of EV control parameters generated by the EV.

7. The method according to claim 1, wherein collecting the plurality of sets of target-vehicle controls includes:

collecting the plurality of sets of target-vehicle controls generated by inputting the plurality of vehicle parameters of the EV into a target-vehicle simulator simulating behaviors of the target vehicle;

collecting the plurality of sets of target-vehicle controls generated by a plurality of anonymized target vehicles; and/or collecting the plurality of sets of target-vehicle controls generated by the target vehicle.

8. The method according to claim 1, wherein:

the neural network is a cycle generative adversarial network (CycleGAN) including a first generator model, a first discriminator, a second generator model, and a second discriminator; and training the neural network includes:
  inputting the plurality of sets of EV control parameters into the first generator model to generate a plurality of sets of simulated target-vehicle controls;
  inputting the plurality of sets of target-vehicle controls and the plurality of sets of simulated target-vehicle controls into the first discriminator to calculate a likelihood of the plurality of sets of simulated target-vehicle controls as the plurality of sets of target-vehicle controls to update the first generator model in each training iteration;
  inputting the plurality of sets of target-vehicle controls into the second generator model to generate a plurality of sets of simulated EV control parameters;
  inputting the plurality of sets of EV control parameters and the plurality of sets of simulated EV control parameters into the second discriminator to calculate a likelihood of the plurality of sets of simulated EV control parameters as the plurality of sets of EV control parameters to update the second generator model in each training iteration; and
  calculating a cycle consistency loss to update the first generator model and the second generator model in each training iteration.

9. The method according to claim 8, wherein calculating the cycle consistency loss comprises:

inputting the plurality of sets of EV control parameters into the first generator model to generate the plurality of sets of simulated target-vehicle controls;

inputting the plurality of sets of simulated target-vehicle controls generated by the first generator model into the second generator model to generate the plurality of sets of simulated EV control parameters; and comparing the plurality of sets of EV control parameters and the plurality of sets of simulated EV control parameters generated by the second generator model.

10. The method according to claim 8, wherein calculating the cycle consistency loss comprises:

inputting the plurality of sets of target-vehicle controls into the second generator model to generate the plurality of sets of simulated EV control parameters;

inputting the plurality of sets of simulated EV control parameters generated by the second generator model into the first generator model to generate the plurality of sets of simulated target-vehicle controls; and comparing the plurality of sets of target-vehicle controls and the plurality of sets of simulated target-vehicle controls generated by the first generator model.

11. The method according to claim 1, wherein:

the plurality of target behaviors of the target vehicle includes vehicle handling characteristics, gear shifting, dynamic engine sound, vibration to a driver seat, a simulated dashboard of the target vehicle, or a combination thereof; and the plurality of target behaviors of the target vehicle is not initially configured on the EV.

12. The method according to claim 1, wherein:

the plurality of vehicle parameters of the EV includes a steering wheel position, vehicle weight distribution, a road surface condition, shock distribution, a brake position, a torque vector, battery availability, an acceleration pedal position, a steering wheel position, observed traction, available power, a motor temperature, a battery temperature, a gyro measurement, an accelerator measurement, a suspension position, a throttle position, a brake position, regeneration settings, a window position, or a combination thereof.

13. The method according to claim 1, wherein:

each set of simulated target-vehicle controls includes a target turn angle, a target steering ratio, target weight distribution, a target wheelbase, target acceleration or deceleration, target drive wheels, target traction settings, target handling characteristics, a target engine sound at least at a driver side of the EV, or a combination thereof.

14. The method according to claim 1, further comprising:

in response to receiving a request from the driver of the EV for performing a simulation of the target vehicle on the EV:
  obtaining safety information associated with the simulation;
  before activating the simulation, determining whether it is safe to activate the simulation; and performing the simulation in response to determining that it is safe to activate the simulation; and
  after activating the simulation, performing a safety check to determine whether it is safe to continue the simulation; and deactivating the simulation in response to at least one of following: (i) a determination that it is unsafe to continue the simulation, or (ii) receiving a request from the driver for deactivating the simulation.

15. The method according to claim 14, wherein:

the safety information includes health information of the EV, local traffic/safety rules and regulations, surrounding information from a driver assistance system; and the safety check includes a first safety check performed on the plurality of configuration parameters to determine that the plurality of configuration parameters are within a first safety range, and a second safety check performed on the one or more control parameters to determine that the one or more control parameters are within a second safety range.

16. The method according to claim 15, wherein:

a reinforcement learning algorithm is used to dynamically adjust the second safety range for the second safety check to minimize the safety risks.

17. A simulating system for an electric vehicle (EV), comprising:

a plurality of input devices, providing a plurality of vehicle parameters;

a memory containing program instructions; and a processor coupled to the memory and the plurality of input devices, and when the program instructions being executed, configured to:
  create a simulation model associating a plurality of target behaviors of a target vehicle with the EV, wherein the simulation model is a neural network trained to reflect a relationship between EV control parameters and simulated target-vehicle controls, and is created by (a) collecting a plurality of sets of EV control parameters, (b) collecting a plurality of sets of simulated target-vehicle controls, (c) processing the plurality of sets of EV control parameters and the plurality of sets of target vehicle controls using heat maps to identify noises through data clustering, and (d) after processing the plurality of sets of EV control parameters and the plurality of sets of target vehicle controls, training the neural network with the plurality of sets of EV control parameters and the plurality of sets of target-vehicle controls to obtain the simulation model corresponding to the target vehicle;

obtain the plurality of vehicle parameters of the EV to generate an additional set of EV control parameters, the plurality of vehicle parameters of the EV at least including run-time parameters of the EV and driving conditions of the EV;

obtain a plurality of configuration parameters of the target vehicle, at least including information of the target vehicle and settings of the target vehicle for a driver;

based on the additional set of EV control parameters and the plurality of configuration parameters of the target vehicle, use the simulation model to provide a set of simulated target-vehicle controls; and output the set of simulated target-vehicle controls to the EV, such that the EV is controlled to achieve the plurality of target behaviors of the target vehicle based on the set of simulated target-vehicle controls.

18. The system according to claim 17, wherein the processor is further configured to:
perform a safety check on the set of simulated target-vehicle controls before outputting the set of simulated target-vehicle controls to the EV.

19. The system according to claim 17, wherein the processor is further configured to:
collect the plurality of sets of EV control parameters generated by inputting the plurality of vehicle parameters of the EV into an EV simulator simulating behaviors of the EV;
collect the plurality of sets of EV control parameters generated by a plurality of anonymized EVs; and/or
collect the plurality of sets of EV control parameters generated by the EV.

20. The EV according to claim 4, wherein:
the plurality of target behaviors of the target vehicle includes vehicle handling characteristics, gear shifting, dynamic engine sound, vibration to a driver seat, a simulated dashboard of the target vehicle, or a combination thereof; and
the plurality of target behaviors of the target vehicle is not initially configured on the EV.

* * * * *